US011214666B2

(12) United States Patent
Toolis et al.

(10) Patent No.: US 11,214,666 B2
(45) Date of Patent: Jan. 4, 2022

(54) CONTROLLING CURE RATE WITH WETTED FILLER

(71) Applicant: PRC-DeSoto International, Inc., Sylmar, CA (US)

(72) Inventors: Amy Liane Toolis, Natrona Heights, PA (US); Lorraine Hsu, Allison Park, PA (US); Daniel Clingerman, Pittsburgh, PA (US); Justin Martin, Harrison City, PA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 55 days.

(21) Appl. No.: 16/848,909

(22) Filed: Apr. 15, 2020

(65) Prior Publication Data
US 2021/0324179 A1 Oct. 21, 2021

(51) Int. Cl.
*C08K 9/02* (2006.01)
*C08K 3/26* (2006.01)

(52) U.S. Cl.
CPC .............. *C08K 9/02* (2013.01); *C08K 3/26* (2013.01); *C08K 2003/265* (2013.01); *C08K 2201/002* (2013.01); *C08K 2201/006* (2013.01)

(58) Field of Classification Search
CPC ....... C08K 9/02; C08K 3/26; C08K 2003/265
See application file for complete search history.

(56) References Cited

U.S. PATENT DOCUMENTS

| | | | |
|---|---|---|---|
| 2,838,413 A | 6/1958 | Young | |
| 3,517,082 A | 6/1970 | Cockerham | |
| 3,931,078 A | 1/1976 | Marrs et al. | |
| 4,141,857 A | 2/1979 | Levy et al. | |
| 4,277,623 A * | 7/1981 | Kubicek | C07C 319/24 568/26 |
| 4,366,307 A | 12/1982 | Singh et al. | |
| 4,609,762 A | 9/1986 | Morris et al. | |
| 4,623,711 A | 11/1986 | Morris et al. | |
| 5,225,472 A | 7/1993 | Cameron et al. | |
| 5,409,985 A * | 4/1995 | Robinson | C08G 75/14 524/450 |
| 6,172,179 B1 | 1/2001 | Zook et al. | |
| 7,009,032 B2 | 3/2006 | Bojkova et al. | |
| 7,390,859 B2 | 6/2008 | Sawant et al. | |
| 7,875,666 B2 | 1/2011 | Gilmore et al. | |
| 8,138,273 B2 | 3/2012 | Rao et al. | |
| 8,466,220 B2 | 6/2013 | Rao et al. | |
| 8,541,513 B2 | 9/2013 | Hobbs et al. | |
| 8,729,216 B2 | 5/2014 | Hobbs et al. | |
| 8,816,023 B2 | 8/2014 | Anderson et al. | |
| 8,952,124 B2 | 2/2015 | Rao et al. | |
| 8,993,691 B2 | 3/2015 | Anderson et al. | |
| 9,079,833 B2 | 7/2015 | Klobes et al. | |
| 9,382,642 B2 | 7/2016 | Yarlagadda et al. | |
| 9,422,451 B2 | 8/2016 | Rao et al. | |
| 9,540,540 B2 | 1/2017 | Rao et al. | |
| 9,663,619 B2 | 5/2017 | Echigoya et al. | |
| 2003/0017938 A1 | 1/2003 | Kissin et al. | |
| 2005/0166800 A1 | 8/2005 | Orange | |
| 2006/0258818 A1 | 11/2006 | Kimura et al. | |
| 2007/0099794 A1 | 5/2007 | Katzen et al. | |
| 2008/0081877 A1 | 4/2008 | Liu et al. | |
| 2009/0082515 A1 | 3/2009 | Sakamoto | |
| 2010/0010133 A1 | 1/2010 | Zook et al. | |
| 2010/0016472 A1 | 1/2010 | Wang et al. | |
| 2010/0137532 A1 | 6/2010 | Perez-Camacho et al. | |
| 2010/0298467 A1 | 11/2010 | Stammer et al. | |
| 2011/0319559 A1 | 12/2011 | Kania et al. | |
| 2012/0130010 A1 | 5/2012 | Azechi | |
| 2013/0143995 A1 | 6/2013 | Saunders et al. | |
| 2013/0203914 A1 | 8/2013 | Debnath et al. | |
| 2014/0275474 A1 | 9/2014 | Rao et al. | |
| 2015/0065662 A1 | 3/2015 | Ziche | |
| 2015/0080541 A1 | 3/2015 | Bini et al. | |
| 2015/0105238 A1 | 4/2015 | Diefenbach et al. | |
| 2016/0090507 A1 | 3/2016 | Keledjian et al. | |
| 2016/0152775 A1 | 6/2016 | Tobis et al. | |
| 2017/0114208 A1 | 4/2017 | Rao et al. | |
| 2017/0158861 A1 | 6/2017 | Kagimasa et al. | |
| 2017/0369757 A1 | 12/2017 | Pisklak et al. | |
| 2019/0010370 A1 | 1/2019 | Lin et al. | |
| 2019/0040264 A1 | 2/2019 | Nishimine et al. | |

FOREIGN PATENT DOCUMENTS

| | | |
|---|---|---|
| EP | 2119732 A1 | 11/2009 |
| EP | 2197922 A1 | 6/2010 |
| EP | 2726180 A1 | 5/2014 |
| JP | 9263699 | 10/1997 |
| JP | 10204412 | 8/1998 |
| JP | 2000053943 | 2/2000 |
| JP | 62-53354 B2 | 5/2015 |
| WO | 2013/046804 A1 | 4/2013 |
| WO | 2014/143289 A1 | 9/2014 |
| WO | 2015/102829 A1 | 7/2015 |
| WO | 2015102967 | 7/2015 |
| WO | 2014/167937 A1 | 2/2017 |
| WO | 2018/031532 A1 | 2/2018 |
| WO | 2018/050127 A2 | 3/2018 |
| WO | 2018/057337 A1 | 3/2018 |
| WO | 2018/085650 A1 | 5/2018 |
| WO | 2018/129708 A1 | 7/2018 |
| WO | 2018/191186 A1 | 10/2018 |
| WO | 2018/164248 A1 | 3/2019 |

* cited by examiner

*Primary Examiner* — Wenwen Cai
(74) *Attorney, Agent, or Firm* — William R. Lambert

(57) ABSTRACT

Compositions include a polythiol and a wetted filler. The composition comprises from 0.1 wt % to 10 wt % water based on the total weight of the composition. The compositions exhibit an extended working time and a rapid onset of cure. The compositions can be used as sealants.

26 Claims, 6 Drawing Sheets

| Component | Amt (g) | | | | | | | | | | | |
|---|---|---|---|---|---|---|---|---|---|---|---|---|
| Example | 1 | 2 | 3 | 4 | 5 | 6 | 7 | 8 | 9 | 10 | 11 | 12 |
| Sealant Base | 99.51 | 99.51 | 99.51 | 99.51 | 99.51 | 99.51 | 99.51 | 99.51 | 99.51 | 99.51 | 99.51 | 99.51 |
| Nicron® 665 (dry) | 2.01 | — | 2.01 | — | — | — | — | — | — | — | — | — |
| Nicron® 665 (wetted) | — | 2.15 | — | — | — | — | — | — | — | — | — | — |
| Polestar® 400 (dry) | — | — | — | 2.02 | — | 2.02 | — | — | — | — | — | — |
| Polestar® 400 (wetted) | — | — | — | — | 2.21 | — | — | — | — | — | — | — |
| ASP® 600 (dry) | — | — | — | — | — | — | 2.01 | — | 2.01 | 2.01 | — | 2.01 |
| ASP® 600 (wetted) | — | — | — | — | — | — | — | 2.23 | — | — | 2.15 | — |
| Water | — | — | 0.14 | — | — | 0.19 | — | — | 0.22 | — | — | 0.14 |
| Total %H$_2$O | 0.01 | 0.14 | 0.14 | 0.02 | 0.20 | 0.18 | 0.01 | 0.21 | 0.21 | 0.01 | 0.14 | 0.14 |
| Force Sum Value (lbf) | 0.49 | 0.57 | 0.58 | 0.46 | 0.64 | 0.71 | 0.48 | 0.65 | 0.77 | 0.36 | 0.47 | 0.64 |

FIG. 1

| Component | Amt (g) | | | | | | | | | | | | | | |
|---|---|---|---|---|---|---|---|---|---|---|---|---|---|---|---|
| Example | 13 | 14 | 15 | 16 | 17 | 18 | 19 | 20 | 21 | 22 | 23 | 24 | 25 | 26 |
| Sealant Base | 99.51 | 99.51 | 99.51 | 99.51 | 99.51 | 99.51 | 99.51 | 99.51 | 99.51 | 99.51 | 99.51 | 99.51 | 99.51 | 99.51 |
| Magnesium hydroxide (dry) | 2.00 | — | 2.00 | — | — | — | — | — | — | — | — | — | — | — |
| Magnesium hydroxide (wetted) | — | 2.10 | — | — | — | — | — | — | — | — | — | — | — | — |
| Ti-Pure® R-900 (dry) | — | — | — | 2.01 | — | 2.01 | — | — | — | — | — | — | — | — |
| Ti-Pure® R-900 (wetted) | — | — | — | — | 2.34 | — | — | — | — | — | — | — | — | — |
| Vertal® 97 (dry) | — | — | — | — | — | — | 2.00 | — | — | — | — | — | — | — |
| Vertal® 97 (wetted) | — | — | — | — | — | — | — | 2.00 | — | — | — | — | — | — |
| Raven® 450P (dry) | — | — | — | — | — | — | — | — | 2.02 | — | 2.02 | 2.02 | — | 2.02 |
| Raven® 450P (wetted) | — | — | — | — | — | — | — | — | — | 3.07 | — | — | 2.85 | — |
| Water | — | — | 0.10 | — | — | 0.33 | — | — | — | — | 1.05 | — | — | 0.84 |
| Total % H₂O | 0.00 | 0.09 | 0.09 | 0.01 | 0.30 | 0.30 | 0.00 | 0.00 | 0.02 | 0.95 | 0.95 | 0.02 | 0.76 | 0.76 |
| Force Gauge Sum Value (lbf) | 0.37 | 0.46 | 0.52 | 0.48 | 1.04 | 1.12 | 0.36 | 0.35 | 0.39 | 2.83 | 2.99 | 0.40 | 2.48 | 2.57 |

FIG. 2

| Component | Amt (g) | | | | | | | | | |
|---|---|---|---|---|---|---|---|---|---|---|
| Example | 27 | 28 | 29 | 30 | 31 | 32 | 33 | 34 | 35 | 36 |
| Sealant Base | 99.51 | 99.51 | 99.51 | 99.51 | 99.51 | 99.51 | 99.51 | 99.51 | 99.51 | 99.51 |
| Winnofil® SPM (dry) | 2.00 | – | 2.00 | – | – | – | – | – | – | – |
| Winnofil® SPM (wetted) | – | 3.19 | – | – | – | – | – | – | – | – |
| Socal® 31 (dry) | – | – | – | 2.00 | – | 2.00 | – | – | – | – |
| Socal® 31 (wetted) | – | – | – | – | 2.79 | – | – | – | – | – |
| Lo-Vel® 2018 (dry) | – | – | – | – | – | – | 2.05 | – | 2.05 | – |
| Lo-Vel® 2018 (wetted) | – | – | – | – | – | – | – | 4.10 | – | – |
| Sipernat® D13 (dry) | – | – | – | – | – | – | – | – | – | 2.00 |
| Water | – | – | 1.18 | – | – | 0.79 | – | – | 2.05 | – |
| Total %H₂O | 0.00 | 1.05 | 1.05 | 0.00 | 0.70 | 0.70 | 0.05 | 1.85 | 1.85 | 0.00 |
| Force Sum Value (lbf) | 0.35 | 2.59 | 2.89 | 0.45 | 1.92 | 2.43 | 0.40 | 1.74 | 1.89 | 0.41 |

FIG. 3

CONTROLLING CURE RATE WITH WETTED FILLER

FIELD

The invention relates to compositions containing polythiols and wetted filler. Wetted filler can release water into a composition to accelerate oxidative thiol/thiol curing reactions. The use of wetted filler can provide compositions having a shorter curing time without compromising the working time as compared to compositions with directly-added water.

BACKGROUND

Commercially available polythiol compositions can have a working time of several hours and at the end of the working time, can take more than eight hours to cure. Water added to the sealant can increase the curing rate but also unacceptably reduce the working time.

Polythiol compositions that exhibit a working time of several hours and a curing time of less than eight hours are desired.

SUMMARY

According to the present invention, compositions comprise a polythiol; and a wetted filler, wherein the wetted filler comprises greater than 0.1 wt % water, wherein wt % is based on the total weight of the wetted filler, and wherein the composition comprises from 0.1 wt % to 10 wt % water, wherein the water is derived from the wetted filler, and wt % is based on the total weight of the composition.

BRIEF DESCRIPTION OF THE DRAWINGS

The drawings described herein are for illustration purposes only. The drawings are not intended to limit the scope of the present disclosure.

FIG. 1 is a table showing shows the constituents of the sealant base component used to prepare the polysulfide sealants in FIGS. 4-6 and the force gauge sum value for each of the polysulfide sealants.

FIG. 2 is a table shows the constituents of the sealant base component used to prepare the polysulfide sealants in FIGS. 4-6 and the force gauge sum value for each of the polysulfide sealants.

FIG. 3 is a table showing the constituents of the sealant base component used to prepare the polysulfide sealants in FIGS. 4-6 and the force gauge sum value for each of the polysulfide sealants.

DETAILED DESCRIPTION

Figure 4:
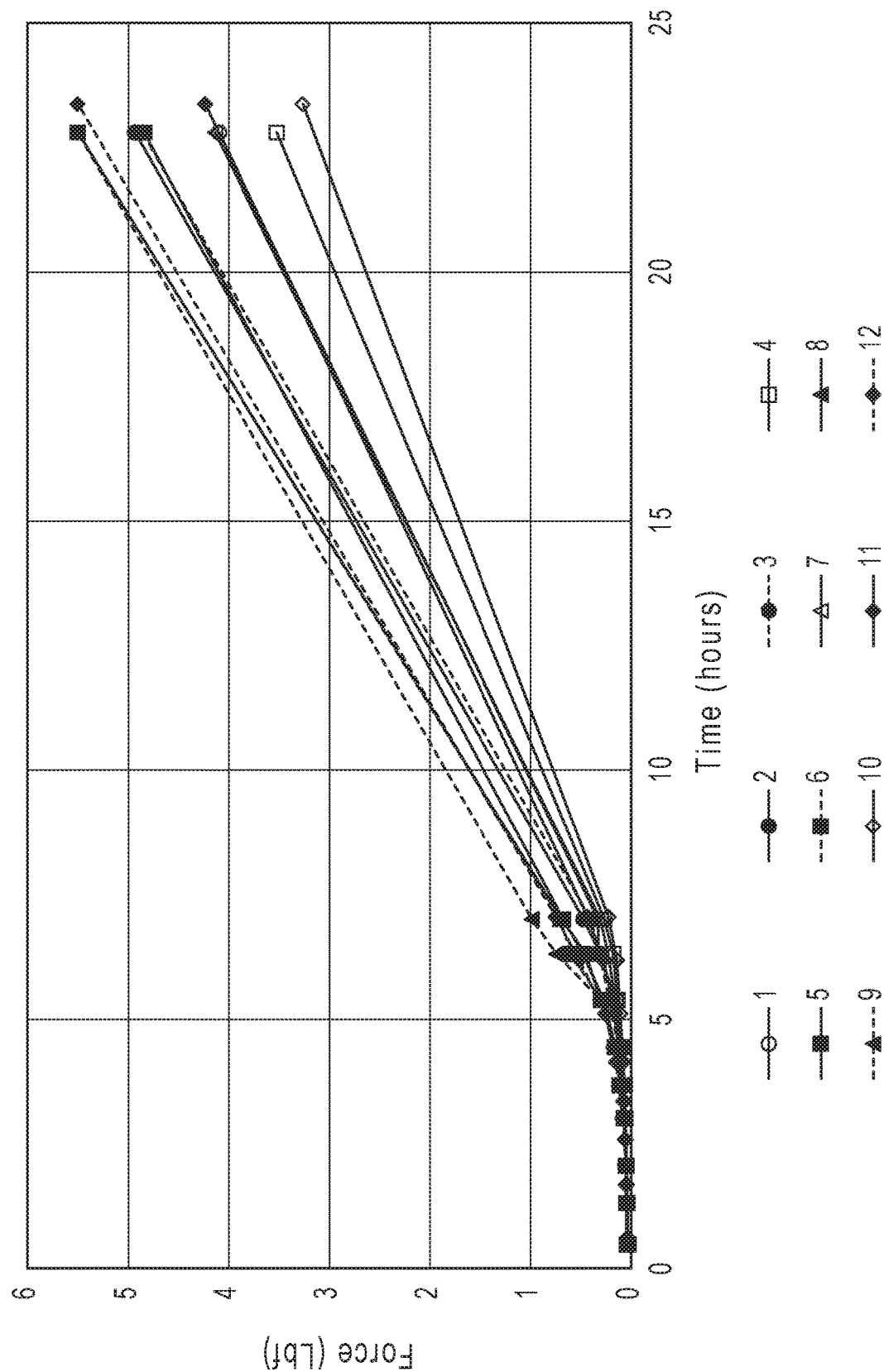
FIG. 4 shows the force value during cure of polysulfide sealants containing dried filler, dried filler and water, or wetted filler.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane-1,12-diyl.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group is $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

A "branched" group such as a branched $C_{2-10}$ alkanediyl refers to a non-linear $C_{2-10}$ alkanediyl in which at least one carbon atom is bonded to at least three carbon atoms. For example, the moiety —$CH_2$—$CH_2$—$CH_2$—$CH_2$— is a linear $C_4$ alkanediyl, and the moiety —$CH_2$—$CH(-CH_3)$—$CH_2$—$CH_2$— is an example of a branched $C_4$ alkanediyl.

"BET surface area" is determined according to DIN EN ISO 9277/DIN 66132.

"Total pore volume" is determined using $N_2$ desorption isotherms according to ASTM D-3663-78.

"Average pore diameter" is determined using $N_2$ desorption isotherms according to ASTM D-3663-78.

"Composition" is intended to encompass a product comprising the specified components in the specified amounts, as well as any product which results, directly or indirectly, from the combination of the specified ingredients in the specified amounts.

As used herein, the term "cure" or "cured" as used in connection with a composition, e.g., "composition when cured" or a "cured composition", means that any curable or crosslinkable components of the composition are at least partially reacted or crosslinked.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, filler, pigments, and adhesion promoters. A curable composition may be curable at room temperature or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed, and the viscosity of the curable composition can increase and at some point, will no longer be workable, as described herein. The duration between when the two components, i.e., the Base component and the Accelerator component, are mixed to form the curable composition and when the curable composition can no longer be reasonably or practically applied to a surface for its intended purpose is referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A, determined according to ISO 868. For coating applications, a curable composition can have a viscosity, for example, from 200 cps to 800 cps 0.2 (Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"Force sum value" refers to a value obtained by measuring the force of a probe applied to a sealant sample at intervals during cure, multiplying the inverse of the time of measurement by the measured force, and summing the calculated values up to twenty-eight (28) hours after the Base and Accelerator are combined to provide the curable sealant composition. The force measurements were determined using a Mark-10 M5-5 force gauge mounted on a Mark-10 ESM303 test stand (Mark-10 Corporation). The samples were measured at a probe speed of 1.5 in/min to a set depth of 0.2 in. The force sum value is used to quantify the cure rate. A higher force sum value corresponds to a faster cure rate.

"JRF Type I" (Jet Reference Fluid Type I) is employed for determination of solvent resistance and has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1., available from SAE (Society of Automotive Engineers)). JRF Type I testing is performed according to methods described in ASTM D792 (American Society for Testing and Materials) or AMS 3269 (Aerospace Material Specification).

"Molecular weight" refers to a theoretical molecular weight estimated from the chemical structure of a compound such as a monomeric compound, or a number average molecular weight as appropriate for a prepolymer determined, for example, by gel permeation chromatography using polystyrene standards.

"Particle diameter" is determined according to the median value obtained from laser diffraction measurement according to ISO 13320.

"Polyfunctional moiety" refers to the moiety containing three or more moieties bonded to a common moiety. A common moiety can be derived from, for example, an atom such as a carbon atom, a cycloalkane, a heterocycloalkane, an arene, a heteroarene, an alkane, or a heteroalkane group. A polyfunctional moiety can be, for example, $C_{2-20}$ alkane-triyl, $C_{2-20}$ heteroalkane-triyl, $C_{5-10}$ cycloalkane-triyl, $C_{5-10}$ heterocycloalkane-triyl, $C_{6-20}$ alkanecycloalkane-triyl, $C_{6-20}$ heteroalkanecycloalkane-triyl, substituted $C_{2-20}$ alkane-triyl, substituted $C_{2-20}$ heteroalkane-triyl, substituted $C_{5-10}$ cycloalkane-triyl, substituted $C_{5-10}$ heterocycloalkane-triyl, substituted $C_{6-20}$ alkanecycloalkane-triyl, or substituted $C_{6-20}$ heteroalkanecycloalkane-triyl. A polyfunctional moiety can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

"Prepolymer" refers to oligomers, homopolymers, and copolymers. A prepolymer includes repeating units in the prepolymer backbone. A homopolymer refers to a prepolymer in which the repeat units are the same. A copolymer refers to a prepolymer includes alternating copolymers, random copolymers, and block copolymers. A prepolymer can have a number average molecular weight, for example, greater than 1,000 Da, greater than 2,000 Da, or greater 3,000 Da. For thiol-functional prepolymers, molecular weights are number average molecular weights "Mn" as determined by end group analysis using iodine titration. For example, the SH content of thiol-functional prepolymer can be determined using iodine titration. For prepolymers that are not thiol-functional, the number average molecular weights are determined by gel permeation chromatography using polystyrene standards. A prepolymer comprises reactive groups capable of reacting with another compound such as a curing agent or crosslinker to form a cured polymer. A prepolymer can be combined with a curing agent to provide a curable composition, which can cure to provide a cured polymer network. Prepolymers are liquid at room temperature (25° C.) and pressure (760 torr; 101 kPa). Prepolymers are reacted with another compound to provide a cured polymer network. A prepolymer includes multiple repeating subunits bonded to each other than can be the same or different. The multiple repeating subunits make up the backbone of the prepolymer.

Shore A hardness is measured using a Type A durometer in accordance with ASTM D2240.

Specific gravity and density of compositions and sealants is determined according to ISO 2781.

"Thiol-functional" such as a "thiol-functional prepolymer" refers to a compound such as a prepolymer having one or more thiol —SH groups capable of reacting with thiol-reactive group.

"Thiol-reactive" group refers to a chemical group capable of reacting with a thiol group such as a thiol group, an alkenyl group, an epoxy group, a Michael acceptor group, or an isocyanate group.

Sulfur-containing prepolymer" refers to a prepolymer in which the repeating unit of the prepolymer backbone comprises sulfur atom such as —S— or —$S_n$— groups. Thiol-functional prepolymers have reactive thiol groups at the ends of the prepolymer backbone. Prepolymers can have pendent reactive thiol groups extending from the prepolymer backbone. Prepolymers having only thiol-functional and/or only pendent thiol groups are not encompassed by a sulfur-containing prepolymer.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number(s) of carbon atoms from 2 to 10.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

A composition provided by the present disclosure can comprise a polythiol and a wetted filler, where the wetted filler comprises greater than 0.1 wt % water, and where wt % is based on the total weight of the wetted filler.

A composition provided by the present disclosure can comprise a wetted filler or a combination of wetted filler.

A wetted filler refers to a filler that comprises greater than 0.1 wt % water, where wt % is based on the total weight of the wetted filler.

A wetted filler can comprise, for example, from 0.1 wt % to 70 wt % water, from 0.5 wt % to 60 wt %, from 0.5 wt % to 50 wt %, from 0.5 wt % to 40 wt %, from 0.5 wt % to 30 wt %, from 0.5 wt % to 20 wt %, from 0.5 wt % to 10 wt %, from 0.5 wt % to 5 wt %, or from 1 wt % to 4 wt % water, where wt % is based on the total weight of the wetted filler.

A wetted filler can comprise, for example less than 70 wt % water, less than 60 wt %, less than 50 wt %, less than 40 wt %, less than 30 wt %, less than 20 wt %, less than 10 wt %, or less than 5 wt % water, where wt % is based on the total weight of the wetted filler.

A wetted filler can comprise, for example, greater than 0.1 wt % water, greater than 0.5 wt %, greater than 1 wt %, greater than 5 wt %, greater than 15 wt %, greater than 25 wt %, greater than 35 wt %, or greater than 45 wt % water, where wt % is based on the total weight of the wetted filler.

A composition provided by the present disclosure can comprise, for example, from 0.1 wt % to 10 wt % water, where the water is derived from the wetted filler, and wt % is based on the total weight of the composition. Water derived from the wetted filler refers to water that is adsorbed by the wetted filler, released into the composition from the wetted filler, or a combination thereof.

A composition provided by the present disclosure can comprise, for example, from 0.5 wt % to 8 wt % water, from 1 wt % 7 wt %, from 1 wt % to 6 wt %, from 1 wt % to 5 wt %, from 1.5 wt % to 4 wt %, or from 1.5 wt % to 3 wt % water, where the water is derived from the wetted filler, and wt % is based on the total weight of the composition. A composition provided by the present disclosure can comprise, for example, from 0.09 wt % to 8 wt % water, from 0.09 wt % 7 wt %, from 0.09 wt % to 6 wt %, from 0.09 wt % to 5 wt %, from 0.09 wt % to 4 wt %, from 0.09 wt % to 2 wt % water, where the water is derived from the wetted filler, and wt % is based on the total weight of the composition.

A composition provided by the present disclosure can comprise, for example, greater than 0.09 wt % water, greater than 0.1 wt %, greater than 0.2 wt %, greater than 0.5 wt %, greater than 1 wt %, greater than 1.5 wt %, greater than 2 wt %, greater than 4 wt %, or greater than 6 wt % water, where the water is derived from the wetted filler, and wt % is based on the total weight of the composition.

A composition provided by the present disclosure can comprise, for example, less than 10 wt % water, less than 8 wt % water, less than 5 wt % water, less than 4 wt % water, less than 3 wt %, less than 2 wt % water, or less than 1 wt % water, where the water is derived from the wetted filler, and wt % is based on the total weight of the composition.

A composition provided by the present disclosure can comprise, for example, from 0.1 wt % to 70 wt % of the wetted filler, and from 0.1 wt % to 10 wt % water, wherein the water is derived from the wetted filler, and wt % is based on the total weight of the composition.

A composition provided by the present disclosure can comprise, for example, from 0.5 wt % to 50 wt % of the wetted filler, and from 0.1 wt % to 8 wt % water, wherein the water is derived from the wetted filler, and wt % is based on the total weight of the composition.

A composition provided by the present disclosure can comprise, for example, from 0.5 wt % to 30 wt % of the wetted filler, and from 0.1 wt % to 6 wt % water, wherein the water is derived from the wetted filler, and wt % is based on the total weight of the composition.

A composition provided by the present disclosure can comprise, for example, from 0.5 wt % to 10 wt % of the wetted filler, and from 0.1 wt % to 4 wt % water, wherein the water is derived from the wetted filler, and wt % is based on the total weight of the composition.

A composition provided by the present disclosure can comprise, for example, from 1 wt % to 5 wt % of the wetted filler, and from 0.5 wt % to 3 wt % water, wherein the water is derived from the wetted filler, and wt % is based on the total weight of the composition.

A composition provided by the present disclosure can comprise, for example, from 0.5 wt % to 10 wt % of the wetted filler; and from 0.2 wt % to 8.0 wt % water, wherein the water is derived from the wetted filler, and wt % is based on the total weight of the composition.

A composition provided by the present disclosure can comprise, for example, from 0.5 wt % to 10 wt % of the wetted filler; and from 0.2 wt % to 4.0 wt % water, wherein the water is derived from the wetted filler, and wt % is based on the total weight of the composition.

A composition provided by the present disclosure can comprise, for example, from 1 wt % to 5 wt % of the wetted filler; and from 0.5 wt % to 3.0 wt % water, wherein the water is derived from the wetted filler, and wt % is based on the total weight of the composition.

A composition provided by the present disclosure can comprise, for example, from 1.5 wt % to 4 wt % of the wetted filler; and from 1.0 wt % to 2.5 wt % water, wherein the water is derived from the wetted filler, and wt % is based on the total weight of the composition.

A composition provided by the present disclosure can comprise, for example, from 2 wt % to 3.5 wt % of the wetted filler; and from 1.0 wt % to 2.0 wt % water, wherein the water is derived from the wetted filler, and wt % is based on the total weight of the composition.

The wt % of water in a wetted filler can be determined, for example, by weighing a sample of wetted filler, drying the sample of wetted filler by heating the sample to a temperature greater than 100° C. for a duration longer than 30 minutes, such as a temperature of 110° C. for 60 minutes, cooling the dried wetted filler to room temperature (25° C.), weighing the sample of dried wetted filler, and calculating the difference to determine the water content of the wetted filler.

Examples of suitable wetted filler include wetted silica, wetted calcium carbonate, wetted carbon black, wetted alumina, wetted zinc oxide, and wetted magnesium hydroxide.

Wetted filler can comprise water and a dry filler, where the water is adsorbed on the dry filler.

A wetted filler can be prepared, for example, by adding distilled water to a sample of dry filler to provide a slurry and then allowing the slurry to dry at room temperature (25° C.) to a powder-like consistency to provide the corresponding wetted filler. The sample of wetted filler can be dispersed, for example, by grinding with a mortar and pestle and/or by sieving to remove agglomerates before adding the wetted filler to a composition. Other physical blending processes can be used to prepare wetted filler, including, for example, spraying water onto dry powder followed by mixing. The wetted filler can be stored in a sealed container prior to use.

Examples of suitable silica filler include fumed silica, hydrophobic silica, hydrophilic silica, precipitated silica, untreated silica, treated silica, or a combination of any of the fore going, that contain adsorbed water.

Examples of suitable hydrophilic silica include Aerosil® 200 (Evonik Corporation) and Hi-Sil® T700 (PPG Industries, Inc.).

Examples of suitable hydrophobic silica include Lo-Vel® 2018 (PPG Industries, Inc.), Lo-Vel® 8100 (PPG Industries, Inc.), and Sipernat® D13 (Evonik Corporation).

Examples of suitable fumed silica include Aerosil® 200 available from Evonik Corporation.

Examples of suitable precipitated silica include Hi-Sil® WB10 and Hi-Sil™ T700 available from PPG Industries, Inc.

Examples of suitable modified silica include Inhibisil® 73 and Inhibisil® 75 available from PPG Industries, Inc.

Suitable silica particles are commercially available, for example, from Evonik Corporation, Cabot Corporation, Wacker Chemie, Dow Corning, PPG Industries, Inc., and Heraeus.

Examples of suitable calcium carbonate include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Examples of suitable carbon black include Raven® and Conductex® carbon blacks available from Birla Carbon, Regal® or Mogul® or Monarch® from Cabot Corporation, Thermax® from Cancarb Limited, and Printex® from Orion Engineered Carbons.

Wetted filler can be in the form of a free-flowing powder.

Wetted filler can have an average particle diameter (d50), for example, from 0.1 μm to 70 μm, such as from 0.5 μm to 30 μm, from 1 μm to 20 μm, or from 2 μm to 10 μm. A wetted filler can have an average particle diameter (d50), for example, greater than 0.1 μm, greater than 0.5 μm, greater than 1 μm, greater than 5 μm, greater than 10 μm, greater than 20 μm, greater than 30 μm, or greater than 40 μm. The average particle diameter (d50) can be determined using laser diffraction.

Wetted filler can have a BET surface area, for example, greater than 1 $m^2/g$, such as greater than 10 $m^2/g$, greater than 20 $m^2/g$, greater than 40 $m^2/g$, greater than 60 $m^2/g$, or greater than 100 $m^2/g$, where BET surface area is measured according to DIN EN ISO 9277/DIN 66132.

Wetted filler can have a BET surface area, for example, from 10 $m^2/g$ to 200 $m^2/g$, from 20 $m^2/g$ to 150 $m^2/g$, or from 30 $m^2/g$ to 100 $m^2/g$, where BET surface area is measured according to DIN EN ISO 9277/DIN 66132.

Wetted filler can have a BET surface area, for example, less than 200 $m_2/g$, less than 150 $m^2/g$, less than 100 $m^2/g$, or less than 50 $m^2/g$, where BET surface area is measured according to DIN EN ISO 9277/DIN 66132.

Wetted filler can have a total pore volume, for example, from 0.01 mL/g to 2.0 mL/g, where total pore volume is measured using $N_2$ desorption isotherms according to ASTM D-3663-78.

Wetted filler can have an average pore diameter, for example, from 10 nm to 30 nm, where average pore diameter is measured using $N_2$ desorption isotherms according to ASTM D-3663-78.

Wetted filler can have an average particle diameter (d50), for example, from 0.1 μm to 40 μm, a BET surface area, for example, from 10 $m^2/g$ to 200 $m^2/g$, a total pore volume, for example, from 0.01 mL/g to 2.0 mL/g, and an average pore diameter, for example, from 10 nm to 30 nm.

A composition provided by the present disclosure are curable by a thiol/thiol oxidation mechanism. A composition can comprise a polythiol, an oxidant, and wetted filler.

A composition provided by the present disclosure can comprise a polythiol or combination of polythiols.

A polythiol can comprise a monomeric polythiol, a thiol-functional prepolymer, or a combination thereof.

A composition provided by the present disclosure can comprise a monomeric polythiol or combination of monomeric polythiols.

A monomeric polythiol can comprise a dithiol, a polythiol having a thiol functionality greater than 2 such as a thiol functionality from 3 to 6, or a combination of any of the forgoing. A monomeric polythiol can comprise a combination of monomeric polythiols having an average thiol functionality greater than 2 such as a thiol functionality from 2.1 to 5.9, or from 2.1 to 2.9.

For example, a monomeric polythiol can be difunctional, trifunctional, tetrafunctional, pentafunctional, hexafunctional, or a combination of any of the foregoing. A monomeric polythiol can comprise a trithiol.

A monomeric dithiol can have, for example, the structure of Formula (1).

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CHR^3)_p-X-]_q(CHR^3)_r-$; wherein, each $R^3$ is independently selected from hydrogen and methyl; each X is independently selected from O, S, and NR wherein R is selected from hydrogen and methyl; p is an integer from 2 to 6; q is an integer from 1 to 5; and r is an integer from 2 to 10.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a lower (e.g., $C_{1-6}$) alkyl group, a lower alkoxy group, or a hydroxyl group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (1), $R^1$ is $-(CH_2)_p-X-]_r(CH_2)_r-$, wherein p is 2, r is 2, q is 1, and X is S); dimercaptodioxaoctane (DMDO) (in Formula (1), $R^1$ is $-[(CH_2)_p-X-]_q(CH_2)_r-$, wherein p is 2, q is 2, r is 2, and X is O); and 1,5-dimercapto-3-oxapentane (in Formula (1), $R^1$ is $-[(CH_2)_p-X-]_q(CH_2)_r-$, wherein p is 2, r is 2, q is 1, and X is O). It is also possible to use dithiols that include both heteroatoms in the carbon backbone and pendent alkyl groups, such as methyl groups. Such dithiols include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Suitable thiol-functional monomers include, for example, mercapto-propionates, mercapto-acetates, mercapto-acrylates, and other polythiols.

Examples of suitable mercapto-propionates include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercaptopropionyloxy)ethyl]isocyanurate (TEMPIC), di-pentaerythritol hexa(3-mercaptopropionate) (di-PETMP), tri(3-mercaptopropionate) pentaerythritol, and triethylolethane tri-(3-mercaptopropionate).

Examples of suitable thiol-functional prepolymers include ethoxylated trimethylolpropane tri(3-mercaptopropionate) and polycaprolactone tetra-3-mercaptopropionate.

Examples of suitable mercapto-acetates include pentaerythritol tetramercaptoacetate (PRTMA), trimethylolpropane trimercaptoacetate (TMPMA), glycol dimercaptoacetate (GDMA), ethyleneglycol dimercaptoacetate, and di-trimethylolpropane tetramercaptoacetate.

Examples of suitable mercapto-acrylates include pentaerythritol tetra-acrylate, tris[2-(3-mercaptopropionyloxy)ethyl]isocyanurate, 2,3-di(2-mercaptoethylthio)-1-propanethiol, dimercaptodiethylsulfide (2,2'-thiodiethanethiol), dimercaptodioxaoctane (2,2'-(ethylenedioxy)diethanethiol, and 1,8-dimercapto-3,6-dioxaoctane.

Suitable thiol-functional monomers are commercially available from Bruno Bock Thiochemicals under the Thiocure® tradename.

A monomeric polythiol can comprise a polythiol of Formula (2):

wherein, B comprises a core of a z-valent polyfunctionalizing agent B(—V)$_z$; z is an integer from 3 to 6; and each —V is independently a moiety comprising a terminal thiol group.

In polythiols of Formula (2), z can be, for example, 3, 4, 5, or 6.

In polythiols of Formula (2), z can be 3. Suitable trifunctional polythiols include, for example, 1,2,3-propanetrithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations polythiols of Formula (2) may also be used.

Other examples of suitable polythiol monomers include 1,2,3-propanetrithiol, isocyanurate-containing trithiols, and combinations thereof, as disclosed, for example, in U.S. Application Publication No. 2010/0010133, which is incorporated by reference in its entirety, and isocyanurates as disclosed, for example, in U.S. Application Publication No. 2011/0319559, which is incorporated by reference in its entirety.

Suitable thiol-functional monomers can be characterized, for example, by a molecular weight less than 1,000 Daltons, less than 750 Daltons, less than 1,000 Daltons, less than 500 Daltons, or less than 250 Daltons. Suitable thiol-functional monomers can be characterized, for example, by a weight average molecular weight from 200 Daltons to 1,000 Daltons, from 200 Daltons to 800 Daltons, from 200 Daltons to 700, Daltons, from 200 Daltons to 600 Daltons, or from 300, Daltons to 600 Daltons. A composition provided by the present disclosure can comprise, for example, from 0.1 wt % to 5 wt % of a polythiol, from 0.2 wt % to 3.5 wt %, from 0.5 wt % to 3 wt %, or from 1 wt % to 3 wt %, of a polythiol, where wt % is based on the total weight of the composition.

Examples of suitable trifunctional thiol-functional polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable polythiol polyfunctionalizing agents include pentaerythritol tetra-acrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy) diethanethiol, 1,8-dimercapto-3,6-dioxaoctane, and combinations of any of the foregoing.

Other examples of polythiol polyfunctionalizing agents and polythiol monomoers include pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example, ethoxylated and/or propoxylated, such as ethoxylated, products of these compounds. Examples include, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), and ditrimethylolpropane tetramercaptoacetate.

Suitable polythiol polyfunctionalizing agents are commercially available, for example, from Bruno Bock Thiochemicals under the Thiocure® tradename.

A thiol-functional prepolymer can comprises any suitable backbone. A thiol-functional prepolymer backbone can be selected, for example, based on the end use requirements of the article to be fabricated using a composition provided by the present disclosure. A thiol-functional prepolymer backbone can be selected based considerations such as tensile strength, elongation, thermal resistance, chemical resistance, low temperature flexibility, hardness, and a combination of any of the foregoing.

For example, a thiol-functional prepolymer backbone can comprise a polythioether, a polysulfide, a polyformal, a monosulfide, a polyisocyanate, a polyurea, polycarbonate, polyphenylene sulfide, polyethylene oxide, polystyrene, acrylonitrile-butadiene-styrene, polycarbonate, styrene acrylonitrile, poly(methylmethacrylate), polyvinylchloride, polybutadiene, polybutylene terephthalate, poly(p-phenyleneoxide), polysulfone, polyethersulfone, polyethylenimine, polyphenylsulfone, acrylonitrile styrene acrylate, polyethylene, syndiotactic or isotactic polypropylene, polylactic acid, polyamide, ethyl-vinyl acetate homopolymer or copolymer, polyurethane, copolymers of ethylene, copolymers of propylene, impact copolymers of propylene, polyetheretherketone, polyoxymethylene, syndiotactic polystyrene (SPS), polyphenylene sulfide (PPS), liquid crystalline polymer (LCP), homo- and copolymer of butene, homo- and copolymers of hexene; and combinations of any of the foregoing.

Examples of other suitable thiol-functional prepolymer backbones include polyolefins (such as polyethylene, linear low-density polyethylene (LLDPE), low-density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly (vinyl alcohols), ethylene/vinyl alcohol copolymers (EVOH), poly(vinyl butyral), poly(methyl methacrylate) and other acrylate polymers and copolymers (including such as methyl methacrylate polymers, methacrylate copolymers, polymers derived from one or more acrylates, methacrylates, ethyl acrylates, ethyl methacrylates, butyl acrylates, butyl methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), polycarbonates (PC), polyamides, polyesters, liquid crystalline polymers (LCPs), poly(lactic acid), poly(phenylene oxide) (PPO), PPO-polyamide alloys, polysulfone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), and poly(vinyl chloride), polyurethanes (thermoplastic and thermosetting), aramides (such as Kevlar®. and Nomex® polytetrafluoroethylene (PTFE), polysiloxanes (including polydimethylenesiloxane, dimethylsiloxane/vinylmethylsiloxane copolymers, vinyldimethylsiloxane terminated poly (dimethylsiloxane)), elastomers, epoxy polymers, polyureas, alkyds, cellulosic polymers (such as ethyl cellulose, ethyl hydroxyethyl cellulose, carboxymethyl cellulose, cellulose acetate, cellulose acetate propionates, and cellulose acetate butyrates), polyethers and glycols such as poly (ethylene oxide)s (also known as poly(ethylene glycol)s, poly(propylene oxide)s (also known as poly(propylene glycol)s, and ethylene oxide/propylene oxide copolymers, acrylic latex polymers, polyester acrylate oligomers and polymers, polyester diol diacrylate polymers, and UV-curable resins.

A thiol-functional prepolymer backbone can comprise a sulfur-containing prepolymer backbone such as a polythioether, a polysulfide, a sulfur-containing polyformal, a monosulfide, or a combination of any of the foregoing.

Examples of suitable thiol-functional elastomeric prepolymer backbones include polyurethanes, copolyetheresters, rubbers such as butyl rubbers and natural rubbers, styrene/butadiene copolymers, styrene/ethylene/butadiene/styrene copolymer (SEBS), polyisoprene, ethylene/propylene copolymers (EPR), ethylene/propylene/diene monomer copolymers (EPDM), polysiloxanes, and polyethers such as poly(ethylene oxide), poly(propylene oxide), and their copolymers.

Examples of suitable thiol-functional polyamide backbones include aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides such as poly(m-xylylene adipamide) (polyamide MXD, 6), and polyterephthalamides such as poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene terephthalamide and hexamethylene adipamide, the polyamide of hexamethyleneterephthalamide, and 2-methylpentamethyleneterephthalamide).

Examples of suitable polyesters include poly(butylene terephthalate) (PBT), poly(ethylene terephthalate) (PET), poly(1,3-propylene terephthalate) (PPT), poly(ethylene naphtalate) (PEN), and poly(cyclohexanedimethanol terephthalate) (PCT).

A thiol-functional prepolymer can comprise a thiol-functional sulfur-containing prepolymer or combination of thiol-functional sulfur-containing prepolymers.

In a thiol-functional sulfur-containing prepolymer the sulfur content of the prepolymer backbone (and not including terminal thiol groups) can be, for example, from 0.1 wt % to 20 wt %, from 0.1 wt % to 10 wt %, form 0.1 wt % to 5 wt %, or from 0.1 wt % to 2 wt %, where wt % refers to the total weight of the sulfur-containing prepolymer.

A composition provided by the present disclosure such as a sealant composition can have a sulfur content, for example, greater than 10 wt %, greater than 15 wt %, greater than 17.5 wt %, greater than 20 wt %, greater than 25 wt %, or greater than 30 wt %, where wt % is based on the total weight of the organic constituents of the sealant composition. Organic constituents of a sealant composition can include polymerizable constituents such as prepolymers, monomers and polyfunctionalizing agents, adhesion promoters, and other organic additives. A sulfur-containing sealant can have a sulfur content, for example, from 10 wt % to 35 wt %, from 10 wt % to 30 wt %, from 10 wt % to 25 wt %, from 10 wt % to 20 wt %, from 12 wt % to 20 wt %, or from 14 wt % to 20 wt %, where wt % is based on the total weight of the sealant composition. Sealant compositions having a high sulfur content can be more resistant to fluids and solvents.

A polythiol can comprise a sulfur-containing polythiol such as a monomeric sulfur-containing polythiol and/or a sulfur-containing thiol-functional prepolymer.

Examples of sulfur-containing thiol-functional prepolymer include thiol-functional polythioether prepolymers, thiol-functional polysulfide prepolymers, thiol-functional sulfur-containing polyformal prepolymers, and thiol-functional monosulfide prepolymers.

A thiol-functional sulfur-containing prepolymer can include a thiol-functional polysulfide prepolymer or a combination of thiol-functional polysulfide prepolymers.

Examples of suitable thiol-functional polysulfide prepolymers are disclosed, for example, in U.S. Pat. Nos. 4,623,711 and 7,009,032.

A suitable thiol-functional polysulfide prepolymer can be a blend of di- and tri-functional molecules where the difunctional polysulfide prepolymers can comprise the structure of Formula (3a) or can comprise a moiety of Formula (3):

    (3)

    (3a)

and the trifunctional polysulfide prepolymers can have the structure of Formula (4a) or can comprise a moiety of Formula (4):

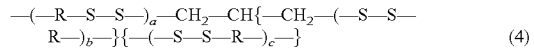    (4)

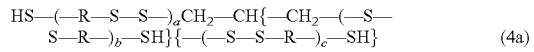    (4a)

where each R is $-(CH_2)_2O-CH_2-O-(CH_2)_2-$, and n=a+b+c, where the value for n can be from 7 to 38 depending on the amount of the trifunctional cross-linking agent (1,2,3-trichloropropane; TCP) used during synthesis of the suitable thiol-functional polysulfide prepolymer. Suitable thiol-functional polysulfide prepolymers can have a number average molecular weight from less than 1,000 Da to 6,500 Da, an SH (thiol) content from 1% to greater than 5.5%, and a cross-linking density from 0% to 2.0%.

Examples of suitable thiol-functional polysulfide prepolymers having a moiety of Formula (4) or the structure of Formula (4a) include Thioplast® G polysulfides such as Thioplast® G1, Thioplast® G4, Thioplast® G10, Thioplast® G12, Thioplast® G21, Thioplast® G22, Thioplast® G44, Thioplast® G122, and Thioplast® G131, which are commercially available from AkzoNobel.

A polysulfide prepolymer can comprise, for example, a combination of Thioplast® G1 and Thioplast® 112.

A suitable thiol-functional polysulfide prepolymer can have a number average molecular weight from 1,000 Da to 7,500 Da, an SH (thiol) content from 0.8% to 7.7%, and a cross-linking density from 0% to 2%. A polysulfide prepolymer can have the general structure of Formula (5a) or can comprise a moiety of Formula (5):

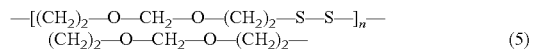    (5)

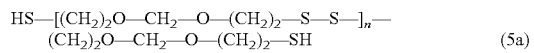    (5a)

where n can be selected such that the number average molecular weight from 1,000 Da to 7,500 Da, such as, for example, an integer from 8 to 80.

Examples of suitable thiol-functional polysulfide prepolymers having a moiety of Formula (5) or the structure of Formula (5a) also include Thiokol® LP polysulfides commercially available from Toray Industries, Inc. such as Thiokol® LP2, Thiokol® LP3, Thiokol® LP12, Thiokol® LP23, Thiokol® LP33, and Thiokol® LP55.

A thiol-functional sulfur-containing prepolymer can comprise a Thiokol-LP® polysulfide, a Thioplast® G polysulfide, or a combination thereof.

A thiol-functional polysulfide prepolymer can comprise a thiol-functional polysulfide prepolymer of Formula (6a) or can comprise a moiety of Formula (6):

    (6)

    (6a)

where, t can be an integer from 1 to 60;

q can be an integer from 1 to 8;

p can be an integer from 1 to 10;

r can be an integer from 1 to 10;

y can have an average value within a range from 1.0 to 1.5; and each R can independently be selected from branched alkanediyl, branched arenediyl, and a moiety having the structure —$(CH_2)_p$—O—$(CH_2)_q$—O—$(CH_2)_r$—.

In thiol-functional polysulfide prepolymers of Formula (6a) and moieties of Formula (6), t can be, for example, an integer from 2 to 60, from 1 to 40, or from 1 to 20.

In thiol-functional polysulfide prepolymers of Formula (6a) and moieties of Formula (6), q can be, for example, an integer from 1 to 6, or an integer from 1 to 4. For example, q can be 1, 2, 3, 4, 5 or 6.

In thiol-functional polysulfide prepolymers of Formula (6a) and moieties of Formula (6), each p can be, for example, an integer from 1 to 6 or from 1 to 4. For example, each p can be 1, 2, 3, 4, 5, 6, 7, 8, 9, or 10.

In thiol-functional polysulfide prepolymers of Formula (6a) and moieties of Formula (6), each r can be, for example, an integer from 1 to 6 or from 1 to 4. For example, each p can be 1, 2, 3, 4, 5, 6, 7, 8, 9, or 10.

In thiol-functional polysulfide prepolymers of Formula (6a) and moieties of Formula (6), each y can independently have a value of 1, 2, 3, 4, 5, or 6.

In thiol-functional polysulfide prepolymers of Formula (6a) and moieties of Formula (6), y can have an average value, for example, of 1, such as from 1.05 to 2, from 1.1 to 1.8, or from 1.1 to 1.5.

In thiol-functional polysulfide prepolymers of Formula (6a) and moieties of Formula (6), R can be —$(CH_2)_p$—O—$(CH_2)_q$—O—$(CH_2)_r$—.

In thiol-functional polysulfide prepolymers of Formula (6a) and moieties of Formula (6), R can be —$(CH_2)_p$—O—$(CH_2)_q$—O—$(CH_2)_r$—, each q can be 1, 2, 3, or 4, and each p and r can be 1 or 2.

In thiol-functional polysulfide prepolymers of Formula (6a) and moieties of Formula (6), 0% to 20% of the R groups can comprise branched alkanediyl or branched arenediyl, and 80% to 100% of the R groups can be —$(CH_2)_p$—O—$(CH_2)_q$—O—$(CH_2)_r$.

In thiol-functional polysulfide prepolymers of Formula (6a) and moieties of Formula (6), a branched alkanediyl or a branched arenediyl can be —$R^1(-A)_n$- where $R^1$ is a hydrocarbon group, n is 1 or 2, and A is a branching point. A branched alkanediyl can have the structure —$CH_2$(—CH(—$CH_2$—)—.

A thiol-functional polysulfide prepolymer of Formula (6a) and moieties of Formula (6) can be prepared by reacting an α,ω-dihalo organic compound, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-functional polysulfide prepolymers of Formula (6a) and moieties of Formula (6) are disclosed, for example, in U.S. Application Publication No. 2016/0152775, in U.S. Pat. No. 9,079,833, and in U.S. Pat. No. 9,663,619.

A thiol-functional polysulfide prepolymer can comprise a thiol-functional polysulfide prepolymer of Formula (7a) or can comprise a moiety of Formula (7):

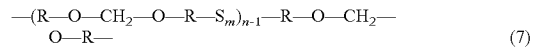

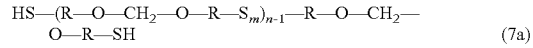

where R can be $C_{2-4}$ alkanediyl, m can be an integer from 1 to 8, and n can be an integer from 2 to 370.

In thiol-functional polysulfide prepolymers of Formula (7a) and moieties of Formula (7), m can have an average value, for example, greater than 1, such as from 1.05 to 2, or from 1.1 to 1.8.

In thiol-functional polysulfide prepolymers of Formula (7a) and moieties of Formula (7), m can be, for example, an integer from 1 to 6, and integer from 1 to 4, or the integer 1, 2, 3, 4, 5, 6, 7, or 8.

In thiol-functional polysulfide prepolymers of Formula (7a) and moieties of Formula (7), n can be, for example, an integer from 2 to 200 or an integer from 2 to 100.

In thiol-functional polysulfide prepolymers of Formula (7a) and moieties of Formula (7), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-functional polysulfide prepolymers of Formula (7a) and moieties of Formula (7) are disclosed, for example, in JP 62-53354.

A thiol-functional polysulfide prepolymer can be liquid at room temperature. Thiol-functional monosulfide prepolymers can have a viscosity of less than 1,500 poise (150 Pa-sec), such as from 40 poise to 500 poise (4 Pa-sec to 50 Pa-sec), at a temperature of about 25° C. and a pressure of 760 mm Hg (101 kPa) determined according to ASTM D-2849 § 79-90 using a Brookfield CAP 2000 viscometer.

A thiol-functional polysulfide prepolymer can have a number average molecular weight, for example, from 300 Da to 10,000 Da, such as from 1,000 Da to 8,000 Da, wherein the molecular weight is determined by gel-permeation chromatography using a polystyrene standard. A thiol-functional polysulfide prepolymer can have a glass transition temperature $T_g$ less than –40° C., less than –55° C., or less than –60° C. The glass transition temperature $T_g$ is determined by Dynamic Mass Analysis (DMA) using a TA Instruments Q800 apparatus with a frequency of 1 Hz, an amplitude of 20 microns, and a temperature ramp of –80° C. to 25° C., with the $T_g$ identified as the peak of the tan δ curve.

A sulfur-containing prepolymer can comprise a thiol-functional polythioether prepolymer or a combination of thiol-functional polythioether prepolymers.

Examples of suitable thiol-functional polythioether prepolymers are disclosed, for example, in U.S. Pat. No. 6,172,179, which is incorporated by reference in its entirety. A thiol-functional polythioether prepolymer can comprise Permapol® P3.1E, Permapol® P3.1E-2.8, Permapol® L56086, or a combination of any of the foregoing, each of which is available from PRC-DeSoto International Inc. Permapol® P3.1E, Permapol® P3.1E-2.8, Permapol® L56086 are encompassed by the disclosure of U.S. Pat. No. 6,172,179.

A thiol-functional polythioether prepolymer can comprise a thiol-functional polythioether prepolymer comprising at least one moiety having the structure of Formula (8), a thiol-functional polythioether prepolymer of Formula (8a), or a combination of any of the foregoing:

wherein, n can be an integer from 1 to 60;

each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR)_p-X-]_q(CHR)_r-$, where, p can be an integer from 2 to 6;

q can be an integer from 1 to 5;

r can be an integer from 2 to 10;

each R can independently be selected from hydrogen and methyl; and each X can independently be selected from O, S, and S—S; and each A can independently be a moiety derived from a polyvinyl ether of Formula (9) or a polyalkenyl polyfunctionalizing agent of Formula (10):

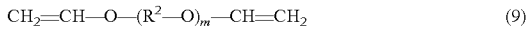  (9)

  (10)

wherein, m can be an integer from 0 to 50;

each $R^2$ can independently be selected from $C_{1-10}$ alkanediyl, $C_{6-8}$ cycloalkanediyl, $C_{6-14}$ alkanecycloalkanediyl, and $-[(CHR)_p-X-]_q(CHR)_r-$, wherein p, q, r, R, and X are as defined as for $R^1$; and B represents a core of a z-valent, polyalkenyl polyfunctionalizing agent $B(-R^4-CH=CH_2)_z$ wherein, z can be an integer from 3 to 6;

each $R^4$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (8) and prepolymers of Formula (8a) and (1b), $R^1$ can be $C_{2-10}$ alkanediyl.

In moieties of Formula (8) and prepolymers of Formula (8a) and (1b), $R^1$ can be $-[(CHR)_p-X-]_q(CHR)_r-$.

In moieties of Formula (8 and prepolymers of Formula (8a), X can be selected from O and S, and thus $-[(CHR)_p-X-]_q(CHR)_r-$ can be $-[(CHR)_p-O-]_q(CHR)_r-$ or $-[(CHR)_p-S-]_q(CHR)_r-$. P and r can be equal, such as where p and r can both be two.

In moieties of Formula (1) and prepolymers of Formula (8a), $R^1$ can be selected from $C_{2-6}$ alkanediyl and $-[(CHR)_p-X-]_q(CHR)_r-$.

In moieties of Formula (8) and prepolymers of Formula (8a), $R^1$ can be $-[(CHR)_p-X-]_q(CHR)_r-$, and X can be O, or X can be S.

In moieties of Formula (8) and prepolymers of Formula (8a), where $R^1$ can be $-[(CHR)_p-X-]_q(CHR)_r-$, p can be 2, r can be 2, q can be 1, and X can be S; or p can be 2, q can be 2, r can be 2, and X can be O; or p can be 2, r can be 2, q can be 1, and X can be O.

In moieties of Formula (8) and prepolymers of Formula (8a), $R^1$ can be $-[(CHR)_p-X-]_q(CHR)_r-$, each R can be hydrogen, or at least one R can be methyl.

In moieties of Formula (8) and prepolymers of Formula (8a), $R^1$ can be $-[(CH_2)_p-X-]_q(CH_2)_r-$ wherein each X can independently be selected from O and S.

In moieties of Formula (8) and prepolymers of Formula (8a), $R^1$ can be $-[(CH_2)_p-X-]_q(CH_2)_r-$ wherein each X can be O or each X can be S.

In moieties of Formula (8) and prepolymers of Formula (8a), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In moieties of Formula (8) and prepolymers of Formula (8a), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In moieties of Formula (8) and prepolymers of Formula (8a), each p can independently be selected from 2, 3, 4, 5, and 6. Each p can be the same and can be 2, 3, 4, 5, or 6.

In moieties of Formula (8) and prepolymers of Formula (8a), each q can independently be 1, 2, 3, 4, or 5. Each q can be the same and can be 1, 2, 3, 4, or 5.

In moieties of Formula (8) and prepolymers of Formula (8a), each r can independently be 2, 3, 4, 5, 6, 7, 8, 9, or 10. Each r can be the same and can be 2, 3, 4, 5, 6, 7, 8, 9, or 10.

In moieties of Formula (8) and prepolymers of Formula (8a), each r can independently be an integer from 2 to 4, from 2 to 6, or from 2 to 8.

In divinyl ethers of Formula (9), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (9), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (9), each $R^2$ can independently be a $C_{2-10}$ n-alkanediyl group, such as methanediyl, ethanediyl, n-propanediyl, or n-butanediyl.

In divinyl ethers of Formula (9), each $R^2$ can independently comprise a $-[(CH_2)_p-X-]_q(CH_2)_r-$ group, where each X can be O or S.

In divinyl ethers of Formula (9), each $R^2$ can independently comprise a $-[(CH_2)_p-X-]_q(CH_2)_r-$ group.

In divinyl ethers of Formula (9), each m can be independently an integer from 1 to 3. Each m can be the same and can be 1, 2, or 3.

In divinyl ethers of Formula (9), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (9), each $R^2$ can independently be a $C_{2-10}$ n-alkanediyl group.

In divinyl ethers of Formula (9), each $R^2$ can independently be a $-[(CH_2)_p-X-]_q(CH_2)_r-$ group, where each X can be O or S.

In divinyl ethers of Formula (9), each $R^2$ can independently be a $-[(CH_2)_p-X-]_q(CH_2)_r-$ group, where each X can be O or S, and each p can independently be 2, 3, 4, 5, and 6.

In divinyl ethers of Formula (9), each p can be the same and can be 2, 3, 4, 5, or 6.

In divinyl ethers of Formula (9), each $R^2$ can independently be a $-[(CH_2)_p-X-]_q(CH_2)_r-$ group, where each X can be O or S, and each q can independently be 1, 2, 3, 4, or 5.

In divinyl ethers of Formula (9), each q can be the same and can be 1, 2, 3, 4, or 5.

In divinyl ethers of Formula (9), each $R^2$ can independently be a $-[(CH_2)_p-X-]_q(CH_2)_r-$ group, where each X can be O or S, and each r can independently be 2, 3, 4, 5, 6, 7, 8, 9, or 10.

In divinyl ethers of Formula (9), each r can be the same and can be 2, 3, 4, 5, 6, 7, 8, 9, or 10. In divinyl ethers of Formula (9), each r can independently be an integer from 2 to 4, from 2 to 6, or from 2 to 8.

Examples of suitable divinyl ethers include ethylene glycol divinyl ether (EG-DVE), butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT International Publication No. WO 2018/085650.

In moieties of Formula (8) each A can independently be derived from a polyalkenyl polyfunctionalizing agent. A polyalkenyl polyfunctionalizing agent can have the structure of Formula (9), where z can be 3, 4, 5, or 6.

In polyalkenyl polyfunctionalizing agents of Formula (9), each $R^4$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3,5-triallyl-1,3,5-triazinane-2,4,6-trione), 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (8) and prepolymers of Formula (8a), the molar ratio of moieties derived from a divinyl ether to moieties derived from a polyalkenyl polyfunctionalizing agent can be, for example, from 0.9 mol % to 0.999 mol %, from 0.95 mol % to 0.99 mol %, or from 0.96 mol % to 0.99 mol %.

In moieties of Formula (8) and prepolymers of Formula (8a), each $R^1$ can be —(CH$_2$)$_2$—O—(CH$_2$)$_2$—O—(CH$_2$)$_2$—; each $R^2$ can be —(CH$_2$)$_2$—; and m can be an integer from 1 to 4.

In moieties of Formula (8) and prepolymers of Formula (8a), each $R^2$ can be derived from a divinyl ether such a diethylene glycol divinyl ether, a polyalkenyl polyfunctionalizing agent such as triallyl cyanurate, or a combination thereof.

In moieties of Formula (8) and prepolymers of Formula (8a), each A can independently be selected from a moiety of Formula (9a) and a moiety of Formula (10a):

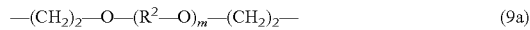

—(CH$_2$)$_2$—O—(R$^2$—O)$_m$—(CH$_2$)$_2$— (9a)

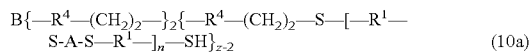

B{—R$^4$—(CH$_2$)$_2$—}$_2${—R$^4$—(CH$_2$)$_2$—S—[—R$^1$—S-A-S—R$^1$—]$_n$—SH}$_{z-2}$ (10a)

where m, $R^1$, $R^2$, $R^4$, A, B, m, n, and z are defined as in Formula (8), Formula (10), and Formula (10).

In moieties of Formula (8) and prepolymers of Formula (8a), each $R^1$ can be —(CH$_2$)$_2$—O—(CH$_2$)$_2$—O—(CH$_2$)$_2$—; each $R^2$ can be —(CH$_2$)$_2$—; m can be an integer from 1 to 4; and the polyfunctionalizing agent B(—R$^4$—CH=CH$_2$)$_z$ comprises triallyl cyanurate where z is 3 and each $R^4$ can be —O—CH$_2$—CH=CH$_2$.

Examples of suitable thiol-functional polythioether prepolymers are disclosed, for example, in U.S. Pat. No. 6,172,179. A thiol-functional polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-functional polythioether prepolymers of Formula (8), (8a), and (10a). Thiol-functional polythioether prepolymers include prepolymers described in U.S. Pat. No. 7,390,859 and urethane-containing polythioether prepolymers described in U.S. Application Publication Nos. 2017/0369757 and 2016/0090507.

A thiol-functional polythioether prepolymer can be liquid at room temperature (20° C.-25° C.) and can have a glass transition temperature $T_g$, for example, less than −20° C., less than −30° C., or less than −40° C. The glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A thiol-functional polythioether prepolymer can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

A thiol-functional polythioether prepolymer can be characterized by a number average molecular weight and/or a molecular weight distribution. A thiol-functional polythioether prepolymer can exhibit a number average molecular weight, for example, from 500 Daltons to 20,000 Daltons, from 2,000 Daltons to 5,000 Daltons, or from 1,000 Daltons to 4,000 Daltons, where the number average molecular weight is determined by iodine titration. A thiol-functional polythioether prepolymer can exhibit a polydispersity ($M_w/M_n$; weight average molecular weight/number average molecular weight; determined using iodine titration), for example, from 1 to 20, or from 1 to 5.

The backbone of a thiol-functional polythioether prepolymer can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), and U.S. Application Publication No. 2017/0114208 (antioxidant-containing), PCT Application Publication No. WO 2018/085650 (sulfur-containing divinyl ether), and PCT Application Publication No. WO 2018/031532 (urethane-containing), each of which is incorporated by reference in its entirety.

Permapol® P3.1E, Permapol® P3.1E-2.8, and Permapol® L56086 are thiol-functional polythioether prepolymers encompassed by the moiety of Formula (8) and the thiol-functional polythioether prepolymers of Formula (8a).

A thiol-functional sulfur-containing prepolymer can comprise a thiol-functional sulfur-containing polyformal.

A thiol-functional sulfur-containing prepolymer can comprise a thiol-functional sulfur-containing polyformal prepolymer or a combination of thiol-functional sulfur-containing polyformal prepolymers. thiol-functional sulfur-containing polyformal prepolymers useful in sealant applications are disclosed, for example, in U.S. Pat. No. 8,729,216 and in U.S. Pat. No. 8,541,513.

A thiol-functional sulfur-containing polyformal prepolymer can comprise a moiety of Formula (11), a thiol-functional sulfur-containing polyformal prepolymer of Formula (11a), a thiol-functional sulfur-containing polyformal prepolymer of Formula (11b), or a combination of any of the foregoing:

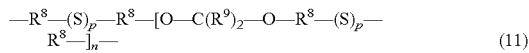

(11)

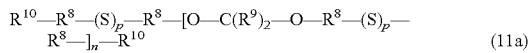

(11a)

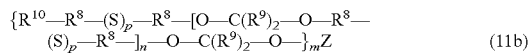

(11b)

where n can be an integer from 1 to 50; each p can independently be selected from 1 and 2; each $R^8$ can be $C_{2-6}$ alkanediyl; and each $R^9$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^{10}$ is a moiety comprising a terminal thiol group; and Z can be derived from the core of an m-valent parent polyol $Z(OH)_m$.

A thiol-functional sulfur-containing prepolymer can comprise a thiol-functional monosulfide prepolymer or a combination of thiol-functional monosulfide prepolymers.

A thiol-functional monosulfide prepolymer can comprise a moiety of Formula (12), a thiol-functional monosulfide prepolymer of Formula (12a), a thiol-functional monosulfide prepolymer of Formula (12b), or a combination of any of the foregoing:

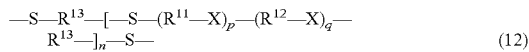

(12)

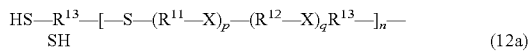

(12a)

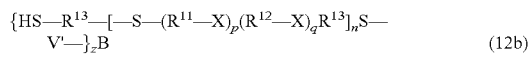

(12b)

wherein, each $R_{11}$ can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{5-10}$ alkylarenediyl;

each $R^{12}$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{5-10}$ alkylarenediyl;

each $R^{13}$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as $C_{6-10}$ alkylcycloalkanediyl; and $C_{5-10}$ alkylarenediyl;

each X can independently be selected from O and S;

p can be an integer from 1 to 5;

q can be an integer from 0 to 5; and n can be an integer from 1 to 60, such as from 2 to 60, from 3 to 60, or from 25 to 35;

B represents a core of a z-valent polyfunctionalizing agent $B(—V)_z$ wherein:

z can be an integer from 3 to 6; and each V can be a moiety comprising a terminal group reactive with a thiol group;

each —V'— can be derived from the reaction of —V with a thiol.

Methods of synthesizing thiol-functional monosulfide prepolymers comprising moieties of Formula (12) or prepolymers of Formula (12a) and (12b) are disclosed, for example, in U.S. Pat. No. 7,875,666.

A thiol-functional monosulfide prepolymer can comprise a moiety of Formula (13), a thiol-functional monosulfide prepolymer comprising a moiety of Formula (13a), a thiol-functional monosulfide prepolymer of Formula (13b), or a combination of any of the foregoing:

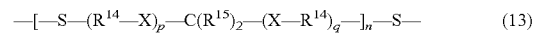

(13)

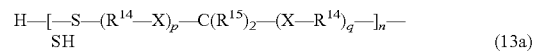

(13a)

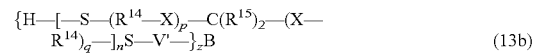

(13b)

wherein, each $R^{14}$ can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^{15}$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{5-10}$ alkylarenediyl;

each X can independently be selected from O and S;

p can be an integer from 1 to 5;

q can be an integer from 1 to 5;

n can be an integer from 1 to 60, such as from 2 to 60, from 3 to 60, or from 25 to 35;

B represents a core of a z-valent polyfunctionalizing agent $B(—V)_z$ wherein:

z can be an integer from 3 to 6; and each V can be a moiety comprising a terminal group reactive with a thiol group; each —V'— can be derived from the reaction of —V with a thiol.

Methods of synthesizing monosulfides of Formula (13)-(13b) are disclosed, for example, in U.S. Pat. No. 8,466,220.

Examples of thiol-functional monosulfide prepolymers are disclosed, for example, in JP 62-53354.

A thiol-functional monosulfide prepolymer can be liquid at room temperature. A thiol-functional monosulfide prepolymer can have a viscosity, at 100% solids, of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer.

A thiol-functional monosulfide prepolymer can have a number average molecular weight within a range from 300 Daltons to 10,000 Daltons, such as within a range 1,000 Daltons to 8,000 Daltons, the molecular weight being determined by gel-permeation chromatography using a polystyrene standard. Thiol-functional monosulfides can have a glass transition temperature $T_g$ less than −40° C., less than −55° C., or less than −60° C.

A composition provided by the present disclosure can comprise a polythiol and a wetted filler.

A composition provided by the present disclosure can comprise, for example, from 0.1 wt % to 70 wt % of a wetted filler or combination of wetted filler, where wt % is based on the total weight of the composition.

A composition provided by the present disclosure can comprise, for example, from 0.1 wt % to 70 wt % of a wetted filler, for 1 wt % to 50 wt % from 1 wt % to 40 wt %, from 1 wt % to 30 wt %, from 1 wt % to 20 wt %, from 1 wt % to 10 wt %, or from 1 wt % to 5 wt % of a wetted filler, where wt % is based on the total weight of the composition.

A composition provided by the present disclosure can comprise, for example, less than 70 wt %, less than 55 wt % of a wetted filler, less than 50 wt %, less than 40 wt %, less than 30 wt %, less than 20 wt %, less than 10 wt %, or less than 5 wt % of a wetted filler, where wt % is based on the total weight of the composition.

A composition provided by the present disclosure can comprise greater than 0.5 wt % of a wetted filler, greater than 1 wt %, greater than 5 wt %, greater than 10 wt %, greater than 20 wt %, greater than 30 wt %, greater than 40 wt % or greater than 50 wt % of a wetted filler, where wt % is based on the total weight of the composition.

A composition provided by the present disclosure can comprise, for example, from 25 wt % to 75 wt % of a polythiol or combination of polythiols, where wt % is based on the total weight of the composition.

A composition provided by the present disclosure can comprise, for example, from 25 wt % to 65 wt % of a polythiol, from 30 wt % to 60 wt %, from 35 wt % to 55 wt %, or from 40 wt % to 50 wt % of a polythiol, where wt % is based on the total weight of the composition.

A composition provided by the present disclosure can comprise, for example, less than 65 wt % of a polythiol, less than 55 wt %, less than 45 wt %, or less than 35 wt % of a polythiol, where wt % is based on the total weight of the composition.

A composition provided by the present disclosure can comprise, for example, greater than 25 wt % of a polythiol, greater than 35 wt %, greater than 45 wt %, or greater than 55 wt % of a polythiol, where wt % is based on the total weight of the composition.

A composition provided by the present disclosure can comprise, for example, from 0.1 wt % to 70 wt % of a wetted filler or combination of wetted filler; and from 25 wt % to 75 wt % of a polythiol or combination of polythiols, where wt % is based on the total weight of the composition.

A composition provided by the present disclosure can comprise, for example, from 1 wt % to 45 wt %, from 1 wt % to 35 wt %, from 1 wt % to 25 wt %, from 1 wt % to 15 wt %, or from 1 wt % to 5 wt % of a wetted filler or combination of wetted filler; and from 25 wt % to 75 wt % of a polythiol or combination of polythiols, where wt % is based on the total weight of the composition.

A composition provided by the present disclosure can comprise, for example, from 1 wt % to 45 wt %, from 1 wt % to 35 wt %, from 1 wt % to 25 wt %, from 1 wt % to 15 wt %, or from 1 wt % to 5 wt % of a wetted filler or combination of wetted filler; and from 35 wt % to 65 wt % of a polythiol or combination of polythiols, where wt % is based on the total weight of the composition.

A composition provided by the present disclosure can comprise, for example, from 1 wt % to 45 wt %, from 1 wt % to 35 wt %, from 1 wt % to 25 wt %, from 1 wt % to 15 wt %, or from 1 wt % to 5 wt % of a wetted filler or combination of wetted filler; and from 45 wt % to 55 wt % of a polythiol or combination of polythiols, where wt % is based on the total weight of the composition.

A composition provided by the present disclosure can comprise, for example, less than 70 wt % of a wetted filler or combination of wetted filler; and less than 75 wt % of a polythiol or combination of polythiols, where wt % is based on the total weight of the composition.

A composition provided by the present disclosure can comprise, for example, less than 55 wt %, less than 45 wt %, less than 35 wt %, less than 25 wt %, less than 15 wt %, or less than 5 wt % of a wetted filler or combination of wetted filler; and less than 75 wt % of a polythiol or combination of polythiols, less than 65 wt %, less than 55 wt %, less than 45 wt %, or less than 35 wt % of a polythiol or combination of polythiols, where wt % is based on the total weight of the composition.

A composition provided by the present disclosure can comprise, for example, greater than 0.1 wt % of a wetted filler or combination of wetted filler; and greater than 25 wt % of a polythiol or combination of polythiols, where wt % is based on the total weight of the composition.

A composition provided by the present disclosure can comprise, for example, greater than 0.1 wt %, greater than 1 wt %, greater than 5 wt %, greater than 15 wt %, greater than 25 wt %, greater than 35 wt %, or greater than 45 wt % of a wetted filler or combination of wetted filler; and greater than 25 wt % of a polythiol or combination of polythiols, great than 35 wt %, greater than 45 wt %, or greater than 55 wt %, of a polythiol or combination of polythiols, where wt % is based on the total weight of the composition.

A composition provided by the present disclosure can comprise, for example, from 0.1 wt % to 70 wt % of the wetted filler, from 0.1 wt % to 10 wt % water, and from 25 wt % to 75 wt % of a polythiol or combination of polythiols, wherein the water is derived from the wetted filler, and wt % is based on the total weight of the composition.

A composition provided by the present disclosure can comprise, for example, from 0.5 wt % to 50 wt % of the wetted filler, from 0.1 wt % to 8 wt % water, and from 25 wt % to 75 wt % of a polythiol or combination of polythiols, wherein the water is derived from the wetted filler, and wt % is based on the total weight of the composition.

A composition provided by the present disclosure can comprise, for example, from 0.5 wt % to 30 wt % of the wetted filler, from 0.1 wt % to 6 wt % water, and from 25 wt % to 75 wt % of a polythiol or combination of polythiols, wherein the water is derived from the wetted filler, and wt % is based on the total weight of the composition.

A composition provided by the present disclosure can comprise, for example, from 0.5 wt % to 10 wt % of the wetted filler, from 0.1 wt % to 4 wt % water, and from 25 wt % to 75 wt % of a polythiol or combination of polythiols, wherein the water is derived from the wetted filler, and wt % is based on the total weight of the composition.

A composition provided by the present disclosure can comprise, for example, from 1 wt % to 5 wt % of the wetted filler, from 0.5 wt % to 3 wt % water, and from 25 wt % to 75 wt % of a polythiol or combination of polythiols, wherein the water is derived from the wetted filler, and wt % is based on the total weight of the composition.

A composition provided by the present disclosure can comprise a thiol/thiol cure activator or a combination of thiol/thiol cure activators.

A thiol/thiol cure activator can comprise an oxidizing agent capable of oxidizing terminal mercaptan groups to form disulfide bonds. Examples of suitable oxidizing agents include lead dioxide, manganese dioxide, calcium dioxide, sodium perborate monohydrate, calcium peroxide, zinc peroxide, and dichromate.

A thiol/thiol cure activator can comprise an inorganic activator, an organic activator, or a combination thereof.

Examples of suitable inorganic thiol/thiol cure activators include metal oxides. Examples of suitable metal oxide activators include zinc oxide (ZnO), lead oxide (PbO), lead peroxide ($PbO_3$), manganese dioxide ($MnO_2$), sodium perborate ($NaBO_3.H_2O$), potassium permanganate ($KMnO_4$), calcium peroxide ($CaCO_3$), barium peroxide ($BaO_3$), cumene hydroperoxide, and combinations of any of the foregoing. A thiol/thiol cure activator can be $MnO_2$.

Metal oxides can be complexed with fatty acids in the form of fatty acid esters such as stearic acid, lauric acid, palmitic acid, oleic acid, and naphthenic acid. The fatty acid can serve to facilitate dispersion of the thiol/thiol cure activator and can function as a solubilizing agent for the metal oxide.

A composition provided by the present disclosure can comprise, for example, from 1 wt % to 10 wt % of a thiol/thiol cure activator or combination of thiol/thiol cure activators, wherein wt % is based on the total weight of the composition. For example, a composition can comprise from 1 wt % to 9 wt %, from 2 wt % to 8 wt %, from 3 wt % to 7 wt %, or from 4 wt % to 6 wt % of an activator or a combination of thiol/thiol cure activators, wherein wt % is based on the total weight of the composition. For example, a composition can comprise greater than 1 wt % of a thiol/thiol cure activator or a combination of thiol/thiol cure activators, greater than 2 wt %, greater than 3 wt %, greater than 4 wt %, greater than 5 wt %, or greater than 6 wt % of a thiol/thiol cure activator or combination of thiol/thiol cure activators, wherein wt % is based on the total weight of the composition.

A composition provided by the present disclosure can comprise a thiol/thiol cure accelerator or a combination of thiol/thiol cure accelerators.

A composition provided by the present disclosure can comprise a lesser amount of a cure accelerator.

A composition provided by the present disclosure can include a thiol/thiol cure accelerator or combination of thiol/thiol cure accelerators.

Thiol/thiol cure accelerators can act as sulfur donors to generate active sulfur fragments capable of reacting with the terminal thiol groups of a polythiol such as a thiol-functional polysulfide prepolymer.

Examples of suitable thiol/thiol cure accelerators include thiazoles, thiurams, sulfenamides, guanidines, dithiocarbamates, xanthates, thioureas, aldehydeamines, and combinations of any of the foregoing.

A thiol/thiol cure accelerator can be thiuram polysulfide, a thiuram disulfide, or a combination thereof.

Examples of suitable thiazoles include bis(2-benzothiazole) disulfide (MBTS), 2-mercaptobenzothiazole (MBT), and the zinc salt of mercaptobenzothiazole (ZMBT).

Examples of suitable thiurams include tetramethyl thiuram monosulfide, tetramethyl thiuram disulfide (TMTD), tetraethyl thiuram disulfide, tetrabutyl thiuram disulfide, dipentamethylene thiuram hexasulfide, dicyclohexamethylene thiuram disulfide, diisopropyl thiuram disulfide, bis (morpholinothiocarbonyl) sulfide, tetramethyl thiuram monosulfide (TMTM), dipentamethylene thiuram tetrasulfide (DPTT), and compounds having the structure $(R)_2N$—$C(=S)$—$S_x$—$C(=S)$—$N(R)_2$ where each R can be $C_{1-6}$ alkyl and x is an integer from 1 to 4, and combinations of any of the foregoing.

Examples of suitable sulfenamides include N-cyclohexyl-2-benzothiazolsulfenamide, tertbutyl-2-benzothiazolsulfenamide (TBBS), dicyclohexyl-2-benzothiazolsulfenamide (DCBS), and combinations of any of the foregoing.

Examples of suitable guanidines include diphenyl guanidine (DPG), N,N'-diorthotolyl guanidine (DOTG), compounds having the structure R—NH—C(=NH)—NH—R where each R is selected from $C_{1-6}$ alkyl, phenyl and toluoyl, and combinations of any of the foregoing.

Examples of suitable dithiocarbamates include zinc dialkyl dithiocarbamates such as dimethyl-dithiocarbamate (ZDMC), diethyl-dithiocarbamate (ZDEC) and dibutyl-dithiocarbamate (ZDBC), other metal or ammonium salts of dithiocarbamoic acid, compounds having the structure $Zn(—S—C(=S)—N(R)_2)$ where each R is selected from $C_{1-6}$ alkyl, phenyl and toluoyl, and combinations of any of the foregoing.

Examples of suitable xanthates include zinc salts of xanthic acid.

Examples of suitable thioureas include ethylene thiourea (ETU), dipentamethylene thiourea (DPTU), dibutyl thiourea (DBTU), and compounds having the structure R—NH—C(=S)—NH—R where each R is selected from $C_{1-6}$ alkyl, phenyl and toluoyl, and combinations of any of the foregoing.

Examples of suitable aldehydeamines include condensation products of aldehydes and amines, such as aniline, ammoniac or their derivates and also butyraldehyde, crotonylaldehyde or formaldehyde such as butyraldehydeaniline and tricrotonylidenetetramine, and combinations of any of the foregoing.

Examples of other suitable thiol/thiol cure accelerators include triazines and sulfides or metallic and amine salts of dialkyldithiophosphoric acids and dithiophosphates such as triazines and sulfides or metallic and amine salts of dialkyldithiophosphoric acids, and combinations of any of the foregoing. For example, a thiol/thiol cure accelerator can be a dithiophosphoric having the structure $Zn(—S—C(=S)—(OR)_2)$.

Examples of non-sulfur-containing thiol/thiol cure accelerators include tetramethyl guanidine (TMG), di-o-tolyl guanidine (DOTG), sodium hydroxide (NaOH), water and bases.

A composition provided by the present disclosure can comprise, for example, from 0.01 wt % to 2 wt % of a thiol/thiol cure accelerator or combination of thiol/thiol cure accelerators, from 0.05 wt % to 1.8 wt %, from 0.1 wt % to 1.6 wt %, or from 0.5 wt % to 1.5 wt % of a thiol/thiol cure accelerator or combination of thiol/thiol cure accelerators, where wt % is based on the total weight of the composition.

A composition provided by the present disclosure can comprise, for example, less than 2 wt %, less than 1.8 wt %, less than 1.6 wt %, less than 1.4 wt %, less than 1.2 wt %, less than 1 wt %, less than 0.5 wt %, less than 0.1 wt %, or less than 0.05 wt % of a thiol/thiol cure accelerator or combination of thiol/thiol cure accelerators, where wt % is based on the total weight of the composition.

A composition provided by the present disclosure can comprise, for example, a dry filler or combination of dry filler.

A composition provided by the present disclosure can comprise a dry filler or combination of dry filler. A dry filler can be included to provide mechanical reinforcement and to control the rheological properties of the composition. Dry filler may be added to A composition to impart desirable physical properties such as, for example, to increase the impact strength, to control the viscosity, or to modify the conductive properties of a cured composition. A dry filler can comprise the same filler as the wetted filler without the higher water content.

A dry filler can comprise, for example, less than 0.05 wt % water, where wt % is based on the total weight of the dry filler. The wt % of water in a dry filler can be determined by weighing the sample of dry filler, drying the sample of dry filler by heating the sample, for example, to a temperature of 110° C. for a duration of 60 minutes, cooling the dried dry filler, weighing the sample of dry filler, and calculating the difference to determine the water content of the dry filler.

A composition can comprise, for example, from 5 wt % to 55 wt % dry filler, from 10 wt % to 50 wt %, from 15 wt % to 45 wt %, from 20 wt % to 40 wt %, or from 25 wt % to 35 wt % dry filler, where wt % is based on the total weight of the composition.

A composition can comprise, for example, less than 55 wt % dry filler, less than 45 wt %, less than 35 wt %, less than 25 wt %, or less than 15 wt % dry filler, where wt % is based on the total weight of the composition.

A composition can comprise, for example greater than 5 wt % dry filler, greater than 15 wt, greater than 25 wt %, greater than 35 wt %, or greater than 45 wt % dry filler, where wt % is based on the total weight of the composition.

A dry filler can comprise an organic filler, and inorganic filler, or a combination thereof.

Inorganic filler useful in a composition provided by the present disclosure and useful for sealant applications such as aviation and aerospace sealant applications include carbon black, calcium carbonate, precipitated calcium carbonate, calcium hydroxide, hydrated alumina (aluminum hydroxide), talc, mica, titanium dioxide, alumina silicate, carbonates, chalk, silicates, glass, metal oxides, graphite, and combinations of any of the foregoing.

An inorganic filler can comprise, for example, silica, calcium carbonate, and combinations thereof. Suitable silica and calcium carbonate filler include any of those listed for wetted filler, but with a water content less than 0.5 wt %, where wt % is based on the total weight of the inorganic filler.

Examples of suitable calcium carbonate filler include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Inorganic filler can be surface treated to provide hydrophobic or hydrophilic surfaces that can facilitate dispersion and compatibility of the inorganic filler with other components of a coreactive composition. An inorganic filler can include surface-modified particles such as, for example, surface modified silica. The surface of silica particles can be modified, for example, to tailor the hydrophobicity or hydrophilicity of the surface of the silica particle. The surface modification can affect the dispensability of the particles, the viscosity, the curing rate, and/or the adhesion.

A composition and sealants provided by the present disclosure can comprise an organic filler or a combination of organic filler. Organic filler can be selected to have a low specific gravity and to be resistant to solvents such as JRF Type I. Suitable organic filler can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7. Organic filler can have a specific gravity, for example, within a range from 0.85 to 1.15, within a range from 0.9 to 1.1, within a range from 0.9 to 1.05, or from 0.85 to 1.05.

Organic filler can comprise thermoplastics, thermosets, or a combination thereof. Examples of suitable thermoplastics and thermosets include epoxies, epoxy-amides, ethylene tetrafluorethylene copolymers, nylons, polyethylenes, polypropylenes, polyethylene oxides, polypropylene oxides, polyvinylidene chlorides, polyvinylfluorides, tetrafluoroethylene, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic filler include polyamides, polyimides, polyethylenes, polyphenylene sulfides, and combinations of any of the foregoing, which can be particles and/or powders.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

Examples of suitable polyimide powders are available from Evonik Industries under the tradename P84®.

An organic filler can include a polyethylene powder, such as an oxidized polyethylene powder. Suitable polyethylene powders are available from Honeywell International, Inc. under the tradename ACumist®, from INEOS under the tradename Eltrex®, and Mitsui Chemicals America, Inc. under the tradename Mipelon™.

The use of organic filler such as polyphenylene sulfide in aerospace sealants is disclosed in U.S. Pat. No. 9,422,451. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4.

A dry filler can include, for example, a low-density filler or combination of low-density filler.

An organic filler can include a low-density such as modified, expanded thermoplastic microcapsules. Suitable modified expanded thermoplastic microcapsules can include an exterior coating of a melamine resin, a melamine/formaldehyde resin, or urea/formaldehyde resin.

A composition provided by the present disclosure can comprise low-density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 μm to 70 μm, in some cases 10 μm to 24 μm, or from 10 μm to 17 μm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon within a wall of a thermoplastic resin. Examples of hydrocarbons suitable for use in such microcapsules include methyl chloride, methyl bromide, trichloroethane, dichloroethane, n-butane, n-heptane, n-propane, n-hexane, n-pentane, isobutane, isopentane, isooctane, neopentane, petroleum ether, and aliphatic hydrocarbons containing fluorine, such as Freon®, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel® microcapsules such as Expancel® DE microspheres available from AkzoNobel. Examples of suitable Expancel® DE microspheres include Expancel® 920 DE 40 and Expancel® 920 DE 80. Suitable low-density microcapsules are also available from Kureha Corporation.

Suitable low-density filler such as low-density microcapsules can have a mean diameter (d0.5), for example, from 1 μm to 100 μm, from 10 μm to 80 μm, or from 10 μm to 50 μm, as determined according to ASTM D1475.

Low-density filler such as low-density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ASTM D1475. Low-density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ASTM D1475.

Low-density filler such as low microcapsules can be characterized by a mean particle diameter from 1 μm to 100 μm and can have a substantially spherical shape. Low-density filler such as low-density microcapsules can be characterized, for example, by a mean particle diameter from 10 μm to 100 μm, from 10 μm to 60 μm, from 10 μm to 40 μm, or from 10 μm to 30 μm, as determined according to ASTM D1475.

Low-density filler can comprise uncoated microcapsules, coated microcapsules, or combinations thereof.

Low-density filler such as low-density microcapsules can comprise expanded microcapsules or microballoons having a coating of an aminoplast resin such as a melamine resin. Aminoplast resin-coated particles are described, for example, in U.S. Pat. No. 8,993,691. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low-density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 μm, less than 1 μm, or less than 0.5 μm. The melamine coating on the low-density microcapsules is believed to render the microcapsules reactive with the thiol-functional polythioether prepolymer and/or the polyepoxide curing agent, which enhances the fuel resistance, and renders the microcapsules resistant to pressure.

The thin coating of an aminoplast resin can have a film thickness of less than 25 μm, less than 20 μm, less than 15 μm, or less than 5 μm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel 3745, Cymel™ XW-3106, Cymel™ MM-100, Cymel™ 370, Cymel™ 373, Cymel™ 380, ASTRO MEL™ 601, ASTRO MEL™ 601ULF, ASTRO MEL™ 400, ASTRO MEL™ NVV-3A, Aricel PC-6A, ASTRO MEL™ CR-1, and ASTRO SET™ 90.

An expanded thermoplastic microcapsule can comprise a coating of a urea-formaldehyde resin. An expanded thermoplastic microcapsule can comprise a coating of a melamine-formaldehyde resin.

Aminoplast resin-coated particles are distinct from uncoated particles that are merely incorporated into a polymer network, such as is the case when uncoated low-density particles are dispersed in a film-forming binder. For aminoplast resin-coated particles, a thin film is deposited on the exterior surface of individual discrete particles such as thermally expanded microcapsules. These aminoplast resin-coated particles may then be dispersed in a film-forming binder, thereby resulting in dispersion of the coated particles throughout a polymer network. The thin coating of an aminoplast resin can cover, for example from 70% to 100%, from 80% to 100%, or from 90% to 100% of the exterior surface of a low-density particle such as a thermally expanded microcapsule. The coating of an aminoplast resin can form a substantially continuous covering on the exterior surface of a low-density particle.

Low-density microcapsules can be prepared by any suitable technique, including, for example, as described U.S. Pat. Nos. 8,816,023 and 8,993,691. Coated low-density microcapsules can be obtained, for example, by preparing an aqueous dispersion of microcapsules in water with a melamine resin, under stirring. A catalyst can then be added, and the dispersion heated to, for example, a temperature from 50° C. to 80° C. Low-density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added, and the mixture stirred for 10 minutes. The solids can be filtered, rinsed with distilled water, and dried overnight at room temperature. The resulting powder of aminoplast resin-coated microcapsules can then be sifted through a 250 µm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ASTM D1475. For example, Expancel™ 920 DE 40 and Expancel™ 920 DE 80 can be characterized by a specific gravity of about 0.03, wherein the specific gravity is determined according to ASTM D1475.

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ASTM D1475.

A composition provided by the present disclose can comprise micronized oxidized polyethylene homopolymer. An organic filler can include a polyethylenes, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon®.

A composition provided by the present disclosure can comprise, for example, from 0.1 wt % to 65 wt % low-density filler, from 1 wt % to 40 wt %, from 1 wt % to 20 wt %, from 1 wt % to 10 wt %, from 1 wt % to 5 wt %, or from 1 wt % to 3 wt % low-density filler, where wt % is based on the total weight of the composition.

A composition can comprise, for example, greater than 0.1 wt % low-density filler, greater than 0.5 wt %, greater than 1 wt %, greater than 2 wt %, greater than 5 wt %, greater than 10 wt %, or greater than 20 wt % low-density filler, where wt % is based on the total weight of the composition.

A composition provided by the present disclosure can comprise, for example, from 0.1 vol % to 65 vol % low-density filler, from 1 vol % to 40 vol %, from 1 vol % to 20 vol %, from 1 vol % to 10 vol %, from 1 vol % to 5 vol %, or from 1 vol % to 3 vol % low-density filler, where vol % is based on the total weight of the composition.

A composition can comprise, for example, greater than 0.1 vol % low-density filler, greater than 0.5 vol %, greater than 1 vol %, greater than 2 vol %, greater than 5 vol %, greater than 10 vol %, greater than 20 vol % low-density filler, or greater than 40 vol % low-density filler, where vol % is based on the total weight of the composition.

A composition provided by the present disclosure can comprise an additive or combination of additives.

Examples of suitable additives include adhesion promotors, colorants, solvents, reactive diluents, rheology modifiers, plasticizers, fire retardants, thermal stabilizers, radiation absorbers, synergists, corrosion inhibiters, extenders, moisture control additives, cure retarders, and combinations of any of the foregoing.

A composition provided by the present disclosure can comprise, for example, from 5 wt % to 25 wt % of an additive or combination of additives, from 8 wt % to 22 wt %, or from 11 wt % to 19 wt % of an additive or combination of additives, where wt % is based on the total weight of the composition.

A composition provided by the present disclosure can comprise, for example, less than 25 wt % of an additive or combination of additives, less than 20 wt %, less than 15 wt %, or less than 10 wt % of an additive or combination of additives, where wt % is based on the total weight of the composition.

A composition provided by the present disclosure can comprise, for example, greater than 5 wt % of an additive or combination of additives, greater than 10 wt %, greater than 15 wt %, or greater than 20 wt % of an additive or combination of additives, where wt % is based on the total weight of the composition.

A composition provided by the present disclosure can comprise an adhesion promoter or combination of adhesion promoters. An adhesion promoter can include a phenolic adhesion promoter, a combination of phenolic adhesion promoters, an organo-functional silane, a combination of organo-functional silanes, or a combination of any of the foregoing. An organosilane can be an amine-functional silane.

The use of aminosilane adhesion promoters can be used to control the acidity of a sealant composition.

A composition such as a sealant provided by the present disclosure can comprise a phenolic adhesion promoter, an organosilane, or a combination thereof. A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes.

Phenolic adhesion promoters can comprise the reaction product of a condensation reaction of a phenolic resin with one or more thiol-functional polysulfides and are referred to as cooked phenolics. Phenolic adhesion promoters can be thiol-functional.

Examples of phenolic resins include 2-(hydroxymethyl) phenol, (4-hydroxy-1,3-phenylene)dimethanol, (2-hydroxy-benzene-1,3,4-triyl) trimethanol, 2-benzyl-6-(hydroxymethyl)phenol, (4-hydroxy-5-((2-hydroxy-5-(hydroxymethyl) cyclohexa-2,4-dien-1-yl)methyl)-1,3-phenylene) dimethanol, (4-hydroxy-5-((2-hydroxy-3,5-bis (hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-functional polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

A composition provided by the present disclosure can comprise an organo-functional adhesion promoter such as an organo-functional alkoxysilane. An organo-functional alkoxysilane can comprise hydrolysable groups bonded to a silicon atom and at least one organofunctional group. An organo-functional alkoxysilane can have the structure $R^{13}$—$(CH_2)_n$—$Si(-OR)_{3-n}R_n$, where $R^{13}$ is an organofunctional group, n is 0, 1, or 2, and R is alkyl such as methyl or ethyl. Examples of organofunctional groups include epoxy, amino, methacryloxy, or sulfide groups. An organofunctional alkoxysilane can be a dipodal alkoxysilane having two or more alkoxysilane groups, a functional dipodal alkoxysilane, a non-functional dipodal alkoxysilane or a combination of any of the foregoing. An organofunctional alkoxysilane can be a combination of a monoalkoxysilane and a dipodal alkoxysilane. For amino functional alkoxysilanes, $R^{13}$ can be —$NH_2$.

An amine-functional alkoxysilane can comprise a primary amine-functional alkoxysilane, a secondary amine-functional alkoxysilane, or a combination thereof. A primary amine-functional alkoxysilane refers to an alkoxysilane having primary amino group. A secondary amine-functional alkoxysilane refers to an alkoxysilane having a secondary amine group. An amine-functional alkoxysilane can comprise, for example, from 40 wt % to 60 wt % of a primary amine-functional alkoxysilane; and from 40 wt % to 60 wt % of a secondary amine-functional alkoxysilane; from 45 wt % to 55 wt % of a primary amine-functional alkoxysilane and from 45 wt % to 55 wt % of a secondary amine-functional alkoxysilane; or from 47 wt % to 53 wt % of a primary amine-functional alkoxysilane and from 47 wt % to 53 wt % of a secondary amine-functional alkoxysilane; where wt % is based on the total weight of the amine-functional alkoxysilane in a composition.

A secondary amine-functional alkoxysilane can be a sterically hindered amine-functional alkoxysilane. In a sterically hindered amine-functional alkoxysilane the secondary amine can be adjacent to a large group or moiety that limits or restricts the degrees of freedom of the secondary amine compared to the degrees of freedom for a non-sterically hindered secondary amine. For example, in a sterically hindered secondary amine, the secondary amine can be adjacent to a phenyl group, a cyclohexyl group, or a branched alkyl group.

Amine-functional alkoxysilanes can be monomeric amine-functional alkoxysilanes having a molecular weight, for example, from 100 Da to 1000 Da, from 100 Da to 800 Da, from 100 Da to 600 Da, or from 200 Da to 500 Da.

Examples of suitable primary amine-functional alkoxysilanes include 4-aminobutyltriethoxysilane, 4-amino-3,3-dimethylbutyltrimethoxysilane, N-(2-aminoethyl)-3-aminopropyltriethoxysilane, 3-(m-aminophenoxy) propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris (methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl) pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional alkoxysilanes include aminoethylaminomethyl)phenethyltrimethoxysilane N-(2-aminoethyl)-3-aminopropyltrimethoxysilane, and n-(β-aminoethyl) γ-aminopropyltrimethoxy silane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(N-ethylamino)isobutyl)methyldiethoxysilane, (3-(N-ethylamino) isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Examples of suitable amino-functional alkoxysilanes under the Silquest® tradename include Silquest® A-1100 (γ-aminopropyltriethoxysilane), Silquest® A-1108 (γ-aminopropylsilsesquioxane), Silquest® A-1110 (γ-aminopropyltrimethoxysilane), Silquest® 1120 (N-β-(aminoethyl)-γ-aminopropyltrimethoxysilane), Silquest® 1128 (benzylamino-silane), Silquest® A-1130 (triaminofunctional silane), Silquest® Y-11699 (bis-(γ-triethoxysilylpropyl)amine), Silquest® A-1170 (bis-(γ-trimethoxysilylpropyl)amine), Silquest® A-1387 (polyazamide), Silquest® Y-19139 (ethoxy based polyazamide), and Silquest® A-2120 (N-β-(aminoethyl)-γ-aminopropylmethyldimethoxysilane).

Suitable amine-functional alkoxysilanes are commercially available, for example, from Gelest Inc., from Dow Corning Corporation, and Momentive.

An organo-functional alkoxysilane can be a mercapto-functional alkoxysilane including, for example, 3-mercaptopropyltriethoxysilane, 3-mercaptopropyltriemthoxysilane, 11-mercaptoundecyltrimethoxysilane, 3-mercaptopropylmethyldimethoxysilane, and combinations of any of the foregoing.

A composition provided by the present disclosure can comprise, for example, from 1 wt % to 16 wt % of an adhesion promoter, from 3 wt % to 14 wt %, from 5 wt % to 12 wt %, or from 7 wt % to 10 wt % of an adhesion promoter or combination of adhesion promoters, where wt % is based on the total weight of the composition.

A composition provided by the present disclosure can comprise less than 16 wt % of an adhesion promoter, less than 14 wt %, less than 12 wt %, less than 10 wt %, less than 8 wt %, less than 6 wt %, less than 4 wt % or less than 2 wt % of an adhesion promoter or combination of adhesion promoters.

A composition provided by the present disclosure can contain a solvent or a combination of solvents. Solvents can be included to adjust the viscosity of the composition and to facilitate application.

Examples of suitable solvents include organic solvents such as toluene, methyl ethyl ketone, benzene, n-hexane, and combinations of any of the foregoing.

A composition provided by the present disclosure can comprise from 1 wt % to 10 wt % solvent, from 2 wt % to 9 wt %, from 3 wt % to 8 wt %, or from 4 wt % to 7 wt % solvent or combination of solvents, where wt % is based on the total weight of the composition.

A composition provided by the present disclosure can comprise less than 10 wt % solvent, less than 8 wt %, less than 6 wt %, less than 4 wt %, or less than 2 wt % solvent or a combination of solvents, where wt % is based on the total weight of the composition.

A composition provided by the present disclosure can contain a plasticizer or a combination of plasticizers. Plasticizers can be included to adjust the viscosity of the composition and to facilitate application.

Examples of suitable plasticizers include a combination of phthalates, terephthalic, isophthalic, hydrogenated terphenyls, quaterphenyls and higher or polyphenyls, phthalate esters, chlorinated paraffins, modified polyphenyl, tung oil, benzoates, dibenzoates, thermoplastic polyurethane plasticizers, phthalate esters, naphthalene sulfonate, trimellitates, adipates, sebacates, maleates, sulfonamides, organophosphates, polybutene, and combinations of any of the foregoing.

A composition provided by the present disclosure can comprise from 0.5 wt % to 7 wt % of a plasticizer or combination of plasticizers from 1 wt % to 6 wt %, from 2 wt % to 5 wt % or from 2 wt % to 4 wt % of a plasticizer or combination of plasticizers, where wt % is based on the total weight of the composition.

A composition provided by the present disclosure can comprise less than 8 wt % plasticizer, less than 6 wt %, less than 4 wt %, or less than 2 wt % of a plasticizer or combination of plasticizers, where wt % is based on the total weight of the composition.

A composition provided by the present disclosure can comprise a corrosion inhibitor or combination of corrosion inhibitors.

Examples of suitable corrosion inhibitors include, for example, zinc phosphate-based corrosion inhibitors, for example, micronized Halox® SZP-391, Halox® 430 calcium phosphate, Halox® ZP zinc phosphate, Halox® SW-111 strontium phosphosilicate Halox® 720 mixed metal phosphor-carbonate, and Halox® 550 and 650 proprietary organic corrosion inhibitors commercially available from Halox. Other suitable corrosion inhibitors include Heucophos® ZPA zinc aluminum phosphate and Heucophos® ZMP zinc molybdenum phosphate, commercially available from Heucotech Ltd.

A corrosion inhibitor can comprise a lithium silicate such as lithium orthosilicate ($Li_4SiO_4$) and lithium metasilicate ($Li_2SiO_3$), MgO, an azole, or a combination of any of the foregoing. The corrosion inhibiting component (2) may further comprise at least one of magnesium oxide (MgO) and an azole.

A corrosion inhibitor can comprise a monomeric amino acid, a dimeric amino acid, an oligomeric amino acid, or a combination of any of the foregoing. Examples of suitable amino acids include histidine, arginine, lysine, cysteine, cystine, tryptophan, methionine, phenylalanine, tyrosine, and combinations of any of the foregoing.

A corrosion inhibitor can comprise a nitrogen-containing heterocyclic compound. Examples of such compounds include azoles, oxazoles, thiazoles, thiazolines, imidazoles, diazoles, pyridines, indolizines, and triazines, tetrazoles, tolyltriazole, and combinations of any of the foregoing.

Examples of suitable triazoles include 1,2,3-triazole, 1,2,4-triazole, benzotriazole, derivatives thereof, and combinations of any of the foregoing. Derivatives of 1,2,3-triazole include 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3-triazole, 1,2,3-triazole aldehyde, 2-methyl-1,2,3-triazole-4-carboxylic acid, and 4-cyano-1,2,3-triazole, or combinations thereof. Derivatives of 1,2,4-triazole include 1-methyl-1,2,4-triazole, 1,3-diphenyl-1,2,4-triazole, 5-amino-3-methyl-1,2,4-triazole, 3-mercapto-1,2,4-triazole, 1,2,4-triazole-3-carboxylic acid, 1-phenyl-1,2,4-triazole-5-one, 1-phenylurazole, and combinations of any of the foregoing. Examples of diazoles include 2,5-dimercapto-1,3,4-thiadiazole.

A corrosion inhibitor can include an azole or combination of azoles. Azoles are 5-membered N-heterocyclic compounds that contain in the heterocyclic ring two double bonds, one to three carbon atoms and optionally a sulfur or oxygen atom. Examples of suitable azoles include benzotriazole, 5-methyl benzotriazole, tolyltriazole, 2,5-dimercapto-1,3,4-thiazole, 2-mercaptobenzothiazole, 2-mercaptobenzimidazole, 1-phenyl-5-mercaptotetrazole, 2-amino-5-mercapto-1,3,4-thiadiazole, 2-mercapto-1-methylimidazole, 2-amino-5-ethyl-1,3,4-thiadiazole, 2-amino-5-ethylthio-1,3,4-thiadiazole, 5-phenyltetrazole, 7H-imidazo(4,5-d)pyrimidine, and 2-amino thiazole. Salts of any of the foregoing, such as sodium and/or zinc salts, can also be used as effective corrosion inhibitors. Other suitable azoles include 2-hydroxybenzothiazole, benzothiazole, 1-phenyl-4-methylimidazole, and 1-(p-tolyl)-4-meththylimidazole.

A composition provided by the present disclosure can comprise corrosion resistant particles such as inorganic oxide particles, including for example, zinc oxide (ZnO), magnesium oxide (MgO), cerium oxide (CeO$_2$), molybdenum oxide (MoO$_3$), silicon dioxide (SiO$_2$), and combinations of any of the foregoing. An inorganic oxide can comprise an oxide of zinc, cerium, yttrium, manganese, magnesium, molybdenum, lithium, aluminum, magnesium, tin, calcium, boron, phosphorous, silicon, zirconium, iron, titanium, or a combination of any of the forgoing. In certain embodiments, the particles comprise an oxide of magnesium, zinc, cerium, or calcium.

A composition provided by the present disclosure can comprise less than 5 wt % of a corrosion inhibitor or combination of corrosion inhibitors, less than 3 wt %, less than 2 wt %, less than 1 wt %, or less than 0.5 wt % of a corrosion inhibitor or combination of a corrosion inhibitors, where wt % is based on the total weight of the composition.

A composition provided by the present disclosure can comprise a moisture control additive or combination of moisture control additives.

Examples of suitable moisture control additives include synthetic zeolite, activated alumina, silica gel, calcium oxide, magnesium oxide, molecular sieve, anhydrous sodium sulfate, anhydrous magnesium sulfate, and combinations of any of the foregoing.

Examples of alkoxysilane compounds useful as moisture control agents include n-propyltrimethoxysilane, vinyltrimethoxysilane, vinylmethyldimethoxysilane, methylsilicate, ethylsilicate, γ-mercaptopropylmethyldimethoxysilane, γ-mercaptopropylmethyldiethoxysilane, γ-glycidoxypropyltrimethoxysilane, and combinations of any of the foregoing.

An example of an oxazolidine compound useful as a moisture control agent is 3-ethyl-2-methyl-2-(3-methylbutyl)-1,3-oxazolidine.

Examples of other suitable moisture control agents include, vinyltrimethoxysilane, vinyltriethoxysilane, N-trimethoxysilylmethyl-O-methylcarbamate, N-dimethoxy(methyl)silylmethyl-O-methylcarbamate, N-methyl[3-(trimethoxysilyl)propyl]carbamate, vinyldimethoxymethylsilane, vinyltris(2-methoxyethoxy)silane, bis(3-triethoxysilylpropyl)amine, bis(3-trimethoxysilylpropyl)amine, N-dimethoxy(methyl)silylmethyl-O-methylcarbamate, oligomeric vinylsilanes, and combinations of any of the foregoing.

A composition provided by the present disclosure can comprise less than 5 wt % of a moisture control agent or combination of moisture control agent, less than 3 wt %, less than 2 wt %, less than 1 wt %, or less than 0.5 wt % of a moisture control agent or combination of a moisture control agents, where wt % is based on the total weight of the composition.

A composition provided by the present disclosure can comprise a fire retardant or combination of fire retardants.

A fire retardant can include an inorganic fire retardant, an organic fire retardant, or a combination thereof.

Examples of suitable inorganic fire retardants include aluminum hydroxide, magnesium hydroxide, zinc borate, antimony oxides, hydromagnesite, aluminum trihydroxide (ATH), calcium phosphate, titanium oxide, zinc oxide, magnesium carbonate, barium sulfate, barium borate, kaolinite, silica, antimony oxides, and combinations of any of the foregoing.

Examples of suitable organic fire retardants include halocarbons, halogenated esters, halogenated ethers, chlorinated and/or brominated flame retardants, halogen free compounds such as organophosphorus compounds, organonitrogen compounds, and combinations of any of the foregoing.

A composition can comprise, for example, from 1 wt % to 30 wt %, such as from 1 wt % to 20 wt %, or from 1 wt % to 10 wt % of a flame retardant or combination of flame retardants based on the total weight of the composition. For example, a composition can comprise less than 30 wt %, less than 20 wt %, less than 10 wt %, less than 5 wt %, or less than 2 wt %, of a flame retardant or combination of flame retardants based on the total weight of the composition.

A composition provided by the present disclosure can contain an extender or a combination of extenders. Extenders can be included to adjust the viscosity of the composition and to facilitate application.

Examples of suitable extenders include talc, silica, clay, calcium sulfate, calcium carbonate, glass fibers, glass beads, carbon black, alumina trihydrate, wollastonite, and combinations of any of the foregoing.

A composition provided by the present disclosure can comprise from 0.1 wt % to 3 wt % of an extender or combination of extenders from 0.2 wt % to 2 wt %, from 0.5 wt % to 1.5 wt % or from 0.5 wt % to 1 wt % of an extender or a combination of extenders, where wt % is based on the total weight of the composition.

A composition provided by the present disclosure can comprise less than 3 wt % of an extender, less than 2 wt %, less than 1 wt %, or less than 0.5 wt % of an extender or combination of extenders, where wt % is based on the total weight of the composition.

A composition provided by the present disclosure can comprise a synergist or combination of synergists. A synergist acts to enhance the activity of the thiol/thiol cure activator and thiol/thiol cure accelerator.

Examples of suitable synergists include polyethers that are terminated in hydroxyl groups, alkyl groups, alkoxy groups, (meth)acryloyl groups, substituted phenyl, or substituted aryloxy groups. A synergist can include a polyether terminated in hydroxyl groups or alkoxy groups.

The polyether backbone can be a prepolymer such as a homopolymer or a copolymer. A prepolymer includes repeating units in the prepolymer backbone. A homopolymer refers to a prepolymer in which the repeat units are the same. A copolymer refers to a prepolymer includes alternating copolymers, random copolymers, and block copolymers.

Examples of suitable polyether synergists include polyethylene glycols, polypropylene glycols, methoxypolyethylene glycol, polytetrahydrofuran, or combinations of any of the foregoing. The combinations can include homopolymers having different chemical structure or can be copolymers in which the segments of the copolymer have a different chemical structure.

Polyether synergists include homopolymer polyethers and copolymer polyethers.

Suitable polyethylene glycols and methoxypolyethylene glycols are available under the Carbowax® tradename from Dow Chemical.

A polyether can comprise Carbowax® 200, Carbowax® 300, Carbowax® 400, Carbowax® 540, Carbowax® 600, Carbowax® 1000, Carbowax® 1450, Carbowax® 350, Carbowax® 550, Carbowax® 750, or a combination of any of the foregoing, which are commercially available from Dow Chemical.

A polyether synergist can comprise a (methoxy polyethyleneglycol methacrylate) such as Bisomer® MPEG350MA, Bisomer® DEGDMA, Bisomer® EP100DMA, Bisomer® EP150DMA, Bisomer® MPEG550MA, Bisomer® PEG200DMA, Bisomer®

PEM63P, Bisomer® PPA6, Bisomer® PPM5, Bisomer® S10W, Bisomer® S20W, or a combination of any of the foregoing, which are commercially available from GEO Specialty Chemicals.

A polyether synergist can comprise, for example, CD553 (MPEG 550), CD730, SR230 (DEGDA), SR231 (DEGDMA), SR203 (THFMA), SR259 (PEG2000DA), SR268 (TTEGDA), SR272, SR306F (TPGDA), SR344 (PEG400DA), SR508 (DPGDA), SR550 (MPEG350MA), SR551 (MPEG550MA), SR6030P (PEG400DMA), SR610 (PEG600DA), SR611, SR644 (PPGDMA400), SR499 (EO6TMPTA), SR501 (PO6TMPTA), SR502 (EO9TMPTA), SR9035 (EO35TMPTA), or a combination of any of the foregoing, which are commercially available from Sartomer America.

A polyether can comprise an ocytlphenyl ethoxylate such as Triton® X-100, Triton® X-102, Triton® X-14, Triton® X-15, Triton® X-165, Triton® X-305, Triton® X-25, and Triton® X-405, or a combination of any of the foregoing, which are commercially available from Dow Chemical.

A polyether synergist can comprise a polyether glycol such as Terathane® PTMEG 250, Terathane® PTMEG 650, Terathane® PTMEG 1000, Terathane® PTMEG 1400, Terathane® PTMEG 1800, Terathane® PTMEG 2000, or a combination of any of the foregoing, which are commercially available from Invista.

A polyether synergist can comprise an ethylene glycol block copolymers such as a ethylene oxide-capped with propylene oxide. Examples include Plurionic® block copolymers such as Pluronic® 17R4, which are commercially available from BASF. Plurionic® 17R4 is a poly(ethylene glycol)-block poly(propylene glycol)-block-poly(ethylene glycol) copolymer.

A polyether synergist can comprise a polypropylene glycol such as Voranol® 220-056, Voranol® 220-056N, Voranol® 220-094, Voranol® 220-1ION, Voranol® 220-260, Voranol® 220-530, Voranol® 222-056, or a combination of any of the foregoing, which are commercially available from Dow Chemical.

A polyether synergist can comprise, for example, polyethylene glycols, polyethylene oxides, poly(ethylene glycol) diacrylates, poly(ethylene glycol) diglycidyl ethers, poly (ethylene glycol) dimethacrylates, poly(ethylene glycol) mono methylethers, poly(ethylene glycol) monomethyl ether monomethacrylates, aliphatic block polyethylene glycols, or a combination of any of the foregoing, which are commercially available, for example, from Polysciences, Inc.

Examples of suitable synergists are disclosed in U.S. application Ser. No. 16/376,034, filed on Apr. 5, 2019, which is incorporated by reference in its entirety.

A composition can comprise an antioxidant or a combination of antioxidants. Examples of suitable antioxidants include phenolic antioxidants such as pentaerythritol tetrakis [3-(3',5'-di-tert-butyl-4'-hydroxyphenyl)propionate] (herein referred to as Irganox® 1010), tris(2,4-di-tert-butylphenyl) phosphite (herein referred to as Irgafos® 168), 3DL-α-tocopherol, 2,6-di-tert-butyl-4-methylphenol, dibutylhydroxyphenylpropionic acid stearyl ester, 3,5-di-tert-butyl-4-hydroxyhydrocinnamic acid, 2,2'-methylenebis(6-tert-butyl-4-methyl-phenol), hexamethylene bis[3-(3,5-di-tert-butyl-4-hydroxyphenyl)propionate], benzenepropanamide, N,N'-1,6-hexanediyl bis[3,5-bis(1,1-dimethylethyl)-4-hydroxy], diethyl 3,5-di-tert-butyl-4-hydroxybenzyl phosphonate, calcium bis[monoethyl(3,5-di-tert-butyl-4-hydroxylbenzyl) phosphonate], triethylene glycol bis(3-tert-butyl-4-hydroxy-5-methylphenyl)propionate, 6,6'-di-tert-butyl-4,4'-butylidenedi-m-cresol, 3,9-bis(2-(3-(3-tert-butyl-4-hydroxy-5-methylphenyl)propionyloxy-1,1-dimethylethyl)-2,4,8,10-tetraoxaspiro[5.5]undecane, 1,3,5-trimethyl-2,4,6-tris(3,5-di-tert-butyl-4-hydroxybenzyl)benzene, 1,1,3-tris (2-methyl-4-hydroxy-5-tert-butylphenyl)butane, (2,4,6-trioxo-1,3,5-triazine-1,3,5(2H,4H,6H)-triyl)triethylene tris [3-(3,5-di-tert-butyl-4-hydroxyphenyl)propionate], tris(3,5-di-tert-butyl-4-hydroxybenzyl) isocyanurate, tris(4-tert-butyl-3-hydroxy-2,6-dimethylbenzyl) isocyanurate, ethylene bis[3,3-bis(3-tert-butyl-4-hydroxyphenyl)butyrate], and 2,6-bis[[3-(1,1-dimethylethyl)-2-hydroxy-5-methylphenyl] octahydro-4,7-methano-1H-indenyl]-4-methyl-phenol.

Suitable antioxidants also include, for example, phenolic antioxidants with dual functionality such 4,4'-thio-bis(6-tert-butyl-m-methyl phenol), 2,2'-sulfanediylbis(6-tert-butyl-4-methylphenol), 2-methyl-4,6-bis(octylsulfanylmethyl)phenol, thiodiethylene bis[3-(3,5-di-tert-butyl-4-hydroxyphenyl)propionate], 2,6-di-tert-butyl-4-(4,6-bis (octylthio)-1,3,5-triazin-2-ylamino)phenol, N-(4-hydroxyphenyl)stearamide, bis(1,2,2,6,6-pentamethyl-4-piperidyl) [[3,5-bis(1,1-dimethylethyl)-4-hydroxyphenyl] methyl]butylmalonate, 2,4-di-tert-butylphenyl 3,5-di-tert-butyl-4-hydroxybenzoate, hexadecyl 3,5-di-tert-butyl-4-hydroxybenzoate, and 2-(1,1-dimethylethyl)-6-[[3-(1,1-dimethylethyl)-2-hydroxy-5-methylphenyl]-methyl]-4-methylphenyl acrylate. Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-phenyl-1-naphthylamine, and 4,4-bis(α,α-dimethylbenzyl)diphenylamine.

A composition provided by the present disclosure can comprise a thiol/thiol oxidation cure retarder or combination of a thiol/thiol oxidation cure retarder.

A thiol/thiol oxidation cure retarder can comprise an acid such as fatty acids, organic or inorganic acids or fatty acid salts. Examples of suitable thiol/thiol cure retarders include phenylphosphonic acid, and itaconic acid. Cure retarders can improve the stability of the thiol/thiol cure activator and thiol/thiol cure accelerator.

A composition provided by the present disclosure can comprise less than 5 wt % of a thiol/thiol oxidation cure retarder, less than 3 wt %, less than 2 wt %, less than 1 wt %, or less than 0.5 wt % of a thiol/thiol cure retarder or combination of thiol/thiol oxidation cure retarders, where wt % is based on the total weight of the composition.

The use of a wetted filler does not substantially change the viscosity of the composition compared to a composition comprising only corresponding dry filler. For example, replacing the dry filler with a wetted filler can change the viscosity of the composition by less than 5%, less than 2% or less than 1% based on the viscosity of the composition containing only the dry filler.

A composition comprising a dry filler in which a portion of the dry filler has been replaced with wetted filler can exhibit a cure rate that is from 1.2 times to 10 times faster such as from 3 times to 10 times faster than the cure rate of the composition without the wetted filler. For example, the cure rate of the sealant composition comprising the wetted filler can be greater than 3 times, greater than 5 times, greater than 7 time or greater than 9 times the cure rate of the sealant composition without the wetted filler. The cure rate can be determined, for example, as described in Example 3.

A composition comprising a wetted filler can have a working time that is longer than the working time of a similar composition that includes dry filler and water, where the amount of water in both compositions is the same. This is shown, for example, in FIG. 6 where Composition 28 containing wetted Winnofil® SPM has a longer working time than Composition 29 containing dry Winnofil® SPM and the same amount of water.

As shown in FIGS. 1-6, the cure rate as reflected in the force sum value or by the curing profiles, the compositions containing either wetted filler or water had a much faster cure rate than the counterpart dry filler. The working time for the compositions containing either wetted filler or water was at least about 2 hours, which is an acceptable working time for many applications.

A composition provided by the present disclosure can have a working time of at least 2 hours and a cure time of less than 8 hours. In contrast, a similar composition without a wetted-filler can have a long working time and a cure time greater than 8 hours. A similar composition without a wetted-filler and with free water exhibits a shorter working time and a short cure time.

The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec).

After the components are mixed, the viscosity of the curing sealant composition increases and the composition begins to gel. At some point, the curing sealant can no longer be applied to a surface using an intended method. This is referred to as the end of the working time. The "working time" is defined as the duration from when the sealant composition is first mixed to the time when the sealant can no longer be practically applied to a surface. As can be appreciated, the working time can depend on a number of factors including, for example, the curing chemistry, the catalyst used, the application method, and the temperature. Once a curable composition is applied to a surface (and during application), the curing reaction can proceed to provide a cured composition.

The composition viscosity continues to increase, develops a tack-free surface, and develops a hardness. Tack free time can be determined according to AS5127/1 (5.8) (Aerospace Standard Test Methods for Aerospace Sealants). Over time, the composition partially cures to hardness 30 Shore A, and then with additional time fully cures to a hardness, for example, of at least 40 Shore A. Hardness can be determined according to AS5127/1 (5.9). The duration between when the sealant is first mixed to the time the sealant develops a hardness of 30 Shore A is referred to as the "cure time." The duration between the end of the "working time" and when the sealant develops a hardness of 30 Shore A is referred to as the "additional cure time." The "cure time" is the sum of the "working time" and the "additional time to cure." At this point the partially cured sealant will resist modest abrasion and impact. Then, over time the hardness of the sealant continues to increase to a maximum value. The sealant is considered to be fully cured when the hardness of the sealant reaches a maximum value and does not continue to appreciably increase. The duration between when the sealant is first mixed to when the sealant is fully cured is referred to as the "time to full cure." A sealant is fully cured when the hardness reaches a maximum and does not continue to increase. After the "cure time" it can take several weeks for a sealant to fully cure. A fully cured sealant can exhibit a hardness, for example, of at least 40 Shore A, a hardness greater than 45 Shore A, or greater than 50 Shore A.

A composition provided by the present disclosure can have a working time of at least 2 hours such as from 2 hours to 3 hours or from 2 hours to 4 hours, and a curing time, for example, of less than 8 hours such as less than 7 hours, less than 6 hours or less than 5 hours.

Compositions such as sealants provided by the present disclosure can be provided as a two-part system comprising a first part and a second part, which can be prepared and stored separately, and then combined and mixed at the time of use.

A first part of the sealant system can comprise, for example, a polythiol and a wetted filler.

A second part of a sealant system can comprise a thiol/thiol cure activator.

Each of the first part and the second part can independently comprise one or more dry filler and one or more additives.

When the first part and the second part are combined to form a curable composition, the curable composition can comprise, a polythiol, a wetted filler, and a thiol/thiol cure activator.

To facilitate homogeneous mixing, it can be desirable that the viscosity of the first and second parts be similar. For example, the first part can have a viscosity that is within 20%, within 10%, or within 5% that of the second part.

A curable composition provided by the present disclosure can be used as a sealant or coating such as vehicle and aerospace sealant and coating, and in particular, as sealant or coating where resistance to hydraulic fluid is desired. A sealant refers to a curable composition that has the ability when cured to resist atmospheric conditions such as moisture and temperature and at least partially block the transmission of materials such as water, water vapor, fuel, solvents, and/or liquids and gases.

A composition provided by the present disclosure may be applied directly onto the surface of a substrate or over an underlayer such as a primer by any suitable coating process.

Furthermore, methods are provided for sealing an aperture utilizing a composition provided by the present disclosure. These methods comprise, for example, applying the curable composition to at least one surface of a part; and curing the applied composition to provide a sealed part.

A composition, including a sealant, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy, urethane, graphite, fiberglass composite, Kevlar®, acrylics, and polycarbonates. A composition provided by the present disclosure may be applied to a substrate such as aluminum or to an aluminum alloy.

A sealant composition provided by the present disclosure may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. The methods may be used to seal apertures on aerospace vehicles including aircraft and aerospace vehicles.

Curing an applied composition encompasses leaving the composition at ambient conditions such as 25° C. and 50% RH and exposing the applied coating to elevated temperature such as a temperature greater than 30° C. for a period of time.

Apertures, surfaces, joints, fillets, fay surfaces including apertures, surfaces, fillets, joints, and fay surfaces of aerospace vehicles, sealed with a composition provided by the present disclosure are also disclosed. The compositions and sealants can also be used to seal fasteners.

The time to form a viable seal using a curable composition provided by the present disclosure can depend on several factors as can be appreciated by those skilled in the art, and as defined by the requirements of applicable standards and specifications. In general, a curable composition provided by the present disclosure develop adhesion strength within about 3 days to about 7 days following mixing and application to a surface. In general, full adhesion strength as well as other properties of a cured composition provided by the present disclosure becomes fully developed up to 7 days following mixing and application of a curable composition to a surface. A viable seal refers to a seal that meets the requirements of an intended use.

A cured composition can have a thickness, for example, from 5 mils to 25 mils (127 µm to 635 µm) such as from 10 mils to 20 mils (254 µm to 508 µm).

A cured composition provided by the present disclosure, such as cured sealants, can exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B. It is also desirable that, when cured, a composition provided by the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

A cured composition provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

A composition provided by the present disclosure provide a cured product, such as a sealant, exhibiting a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

A composition provided a cured product, such as a sealant, that exhibits a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant prepared from a composition provided by the present disclosure can meet or exceed the requirements for aerospace sealants as set forth in AMS 3277.

Apertures, surfaces, joints, fillets, fay surfaces including apertures, surfaces, fillets, joints, and fay surfaces of aerospace vehicles, sealed with A composition provided by the present disclosure are also disclosed.

A composition provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). A composition provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

A composition provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

ASPECTS OF THE INVENTION

Embodiments of the present disclosure are further defined by the following aspects.

Aspect 1. A composition comprising: a polythiol; and a wetted filler, wherein the wetted filler comprises greater than 0.1 wt % water, wherein wt % is based on the total weight of the wetted filler, and wherein the composition comprises from 0.1 wt % to 10 wt % water, wherein the water is derived from the wetted filler, and wt % is based on the total weight of the composition.

Aspect 2. The composition of aspect 1, wherein the wetted filler comprises from 0.1 wt % to 70 wt % water, wherein wt % is based on the total weight of the wetted filler.

Aspect 3. The composition of any one of aspects 1 to 2, wherein the composition comprises from 0.5 wt % to 55 wt % of the wetted filler, wherein wt % is based on the total weight of the composition.

Aspect 4. The composition of any one of aspects 1 to 3, wherein the composition comprises from 0.0.1 wt % to 3 wt % water; the water is derived from the wetted filler; and wt % is based on the total weight of the composition.

Aspect 5. The composition of any one of aspects 1 to 4, wherein the composition comprises from 1 wt % to 5 wt % of the wetted filler; and from 0.5 wt % to 3 wt % water, wherein wt % is based on the total weight of the composition.

Aspect 6. The composition of any one of aspects 1 to 5, wherein the wetted filler comprises water and an inorganic filler.

Aspect 7. The composition of aspect 6, wherein the inorganic filler is characterized by: a BET surface area greater than 1 m$^2$/g; a total pore volume from 0.01 mL/g to 2 mL/g; an average pore diameter from 10 nm to 30 nm; or a combination of any of the foregoing.

Aspect 8. The composition of any one of aspects 6 to 7, wherein the inorganic filler is characterized by a BET surface area greater than 20 m$^2$/g.

Aspect 9. The composition of any one of aspects 1 to 8, wherein the wetted filler comprises a wetted inorganic filler.

Aspect 10. The composition of any one of aspects 1 to 9, wherein the wetted filler comprises wetted silica, wetted calcium carbonate, wetted carbon black, wetted magnesium silicate, wetted aluminum silicate, wetted magnesium hydroxide, or a combination of any of the foregoing.

Aspect 11. The composition of any one of aspects 1 to 9, wherein the wetted filler comprises wetted silica, wetted calcium carbonate, wetted carbon black, or a combination of any of the foregoing.

Aspect 12. The composition of any one of aspects 1 to 11, wherein the polythiol comprises a polythiol monomer, a thiol-functional prepolymer, or a combination thereof.

Aspect 13. The composition of any one of aspects 1 to 12, wherein the polythiol comprises a thiol-functional sulfur-containing prepolymer.

Aspect 14. The composition of aspect 13, wherein the thiol-functional sulfur-containing prepolymer comprises a polysulfide prepolymer.

Aspect 15. The composition of any one of aspects 13 to 14, wherein the composition comprises from 35 wt % to 55 wt % of the thiol-functional sulfur-containing prepolymer, where wt % is based on the total weight of the composition.

Aspect 16. The composition of any one of aspects 13 to 15, wherein, the thiol-functional sulfur-containing prepolymer comprises a polysulfide prepolymer; and the composition further comprises a thiol/thiol cure activator.

Aspect 17. The composition of aspect 16, wherein the thiol/thiol cure activator comprises a metal oxide.

Aspect 18. The composition of any one of aspects 1 to 17, wherein the composition further comprises a dry filler, wherein the dry filler comprises less than 0.05 wt % water, wherein wt % is based on the total weight of the dry filler.

Aspect 19. The composition of aspect 18, wherein the composition comprises 5 wt % to 50 wt % of the dry filler, where wt % is based on the total weight of the composition.

Aspect 20. The composition of any one of aspects 18 to 19, wherein the dry filler comprises a dry inorganic filler.

Aspect 21. A cured composition prepared from the composition of any one of aspects 1 to 20.

Aspect 22. A part comprising the cured composition of aspect 21.

Aspect 23. A method of sealing a part, comprising: applying the composition of any one of aspects 1 to 20 to a surface of a part; and curing the applied composition to seal the part.

Aspect 24. A part sealed using the method of aspect 23.

Aspect 25. A vehicle comprising the part of aspect 24.

Aspect 26. A vehicle of aspect 25, wherein the vehicle is an aerospace vehicle.

Aspect 27. A sealant system comprising: (a) a first part, wherein the first part comprises the composition of any one of aspects 1 to 20; and (b) a second part, wherein the second part comprises a thiol/thiol cure activator.

Aspect 28. A cured sealant prepared from the sealant system of aspect 27.

Aspect 29. A part comprising the cured sealant of aspect 28.

Aspect 30. A method of sealing a part, comprising: combining the first part and the second part of the sealant system of aspect 27, to provide a curable composition; applying the curable composition to a surface of a part; and curing the applied composition to seal the part.

Aspect 31. A part sealed using the method of aspect 30.

Aspect 32. A vehicle comprising the part of aspect 30.

Aspect 33. A vehicle of aspect 32, wherein the vehicle is an aerospace vehicle.

EXAMPLES

Embodiments provided by the present disclosure are further illustrated by reference to the following examples, which describe compositions and properties of the compositions provided by the present disclosure. It will be apparent to those skilled in the art that many modifications, both to materials, and methods, may be practiced without departing from the scope of the disclosure.

Example 1

Sealant Compositions

A manganese dioxide-cured polysulfide sealant similar to that described in U.S. Pat. No. 4,623,711 was prepared. The sealant consisted of two parts; a Base component and an Accelerator component.

The constituents of the Base Component is provided in Table 1 and the composition of the Accelerator component is provided in Table 2.

TABLE 1

Base component.

| Base Component | Amount (wt %) |
| --- | --- |
| Thioplast ® 112 polysulfide prepolymer | 33 |
| Thioplast ® G1 polysulfide prepolymer | 17 |
| Methylon ® 75108 phenolic resin | 8 |
| Polysulfide cure accelerator | 0.15 |
| Additives | 0.60 |
| Ti-Pure ® R-900 titanium dioxide | 3 |
| Socal ® 31 calcium carbonate | 33 |
| Toluene | 4.8 |

TABLE 2

Accelerator component.

| Accelerator Component | Amount (wt %) |
| --- | --- |
| MnO$_2$ activator | 52 |
| Plasticizer | 34 |
| Filler | 8 |
| Additives | 6 |

The Accelerator component was a commercial P/S 890 B-2 accelerator available from PPG Aerospace and contained an MnO$_2$ accelerator, plasticizer, filler, and additives.

To prepare the Base component the constituents listed in Table 1 were combined in the order listed and mixed intermittently using a FlackTek DAC mixer at 2,000 rpm for 1 min between additions.

The filler or water in the amounts listed in FIGS. 1-3 was then added and mixed using the FlackTec DAC mixer at 2,000 rpm for 1 min.

To prepare a curable composition, the Base component was combined with the Accelerator component at a wt % ratio of 10:1 and mixed using a FlackTek mixer at 1,800 rpm for 1 min.

Wetted filler was prepared by adding distilled water to a dry filler until the mixture had a slurry-like consistency. The slurry was dried at 25° C. until the wetted filler reverted back to a powder-like consistency. The slurry was dried for from 16 hours to 7 days to provide the wetted filler. The wetted filler was ground using a mortar and pestle to remove agglomerates. The wetted filler was stored in a glass container prior to use. In these tests, the wetted filer was used within one (1) week after being prepared. The filler used in the experiments are listed in Table 3.

TABLE 3

Filler.

| Filler | Type | BET Surface Area (m$^2$/g) | Source |
| --- | --- | --- | --- |
| Nicron ® 665 | Talc | 15.0 | Imerys S. A. |
| Polestar ® 400 | Kaolin | 13.7 | Imerys S. A. |
| ASP ® 600 | Kaolin | 21.5 | BASF |
| Magnesium hydroxide | Magnesium hydroxide | 4.9 | Alfa Aesar |
| Ti-Pure ® R-900 | Titanium dioxide | 12.7 | Chemours Company |
| Vertal ® 97 | Talc | 1.9 | Imerys S. A. |
| Raven ® 450P | Carbon black | 40.9 | Aditya Birla Chemicals |
| Winnofil ® SPM | Coated calcium carbonate | 28.3 | Solvay |
| Socal ® 31 | Calcium carbonate | 19.6 | Solvay |
| Lo-Vel ® 2018 | Silica | 145.1 | PPG |
| Sipernat ® D13 | Hydrophobic non-wettable silica | 160.3 | Evonik Industries |

Example 2

Measurement Methods

To determine the water content of the wetted filler, a specific quantify of a wetted filler was added to a pre-weighed container and dispersed with distilled water. The mixture was heated for 1 h at 110° C. to remove the water. After removing from the oven and cooling to room temperature, the dried filler was re-weighed, and the weight percent solids and percent water content were calculated. The wt % water content and wt % solids of the filler, where wt % is based on the total weigh to the filler, used in the experimental examples is provided in Table 4.

TABLE 4

Filler water content.

| Filler | wt % water | wt % solids |
| --- | --- | --- |
| Nicron ® 665 (dry) | 0.48 | 99.52 |
| Nicron ® 665 (wetted) | 6.93 | 93.07 |
| Polestar ® 400 (dry) | 0.87 | 99.13 |
| Polestar ® 400 (wetted) | 9.36 | 90.64 |
| ASP ® 600 (dry) | 0.37 | 99.63 |
| ASP ® 600 (wetted) | 10.32 | 89.68 |
| Magnesium hydroxide (dry) | 0.10 | 99.90 |
| Magnesium hydroxide (wetted) | 4.65 | 95.35 |
| Ti-Pure ® R-900 (dry) | 0.40 | 99.60 |
| Ti-Pure ® R-900 (wetted) | 1.10 | 98.90 |
| Vertal ® 907 (dry) | 0.00 | 100.00 |
| Vertal ® 907 (wetted) | 0.13 | 99.87 |
| Raven ® 450P (dry) | 0.87 | 99.13 |
| Raven ® 450P (wetted) | 29.90 | 70.10 |
| Winnofil ® SPM (dry) | 0.20 | 99.80 |
| Winnofil ® SPM (wetted) | 27.23 | 72.77 |
| Socal ® 31 (dry) | 0.17 | 99.83 |
| Socal ® 31 (wetted) | 28.35 | 71.65 |
| Lo-Vel ® 2018 (dry) | 2.51 | 97.49 |
| Lo-Vel ® 2018 (wetted) | 51.19 | 48.81 |
| Sipernat ® D13 (dry) | 0.34 | 99.66 |

To quantify the cure, rate the penetration force of a sealant during cure was determined using a Mark-10 M5-5 force gauge mounted on a Mark-10 ESM303 test stand. The sealant samples were measured at a probe speed of 1.5 in/min and set to a depth of 0.2 in.

The force sum value was calculated by first multiplying the inverse of the time to the measured force value followed by summation of all calculated values up to twenty-eight (28) hours after combining the Base and Accelerator components. The force sum values for the sealants are shown in FIGS. 1-3.

Example 3

Cure Profiles

Figure 5:
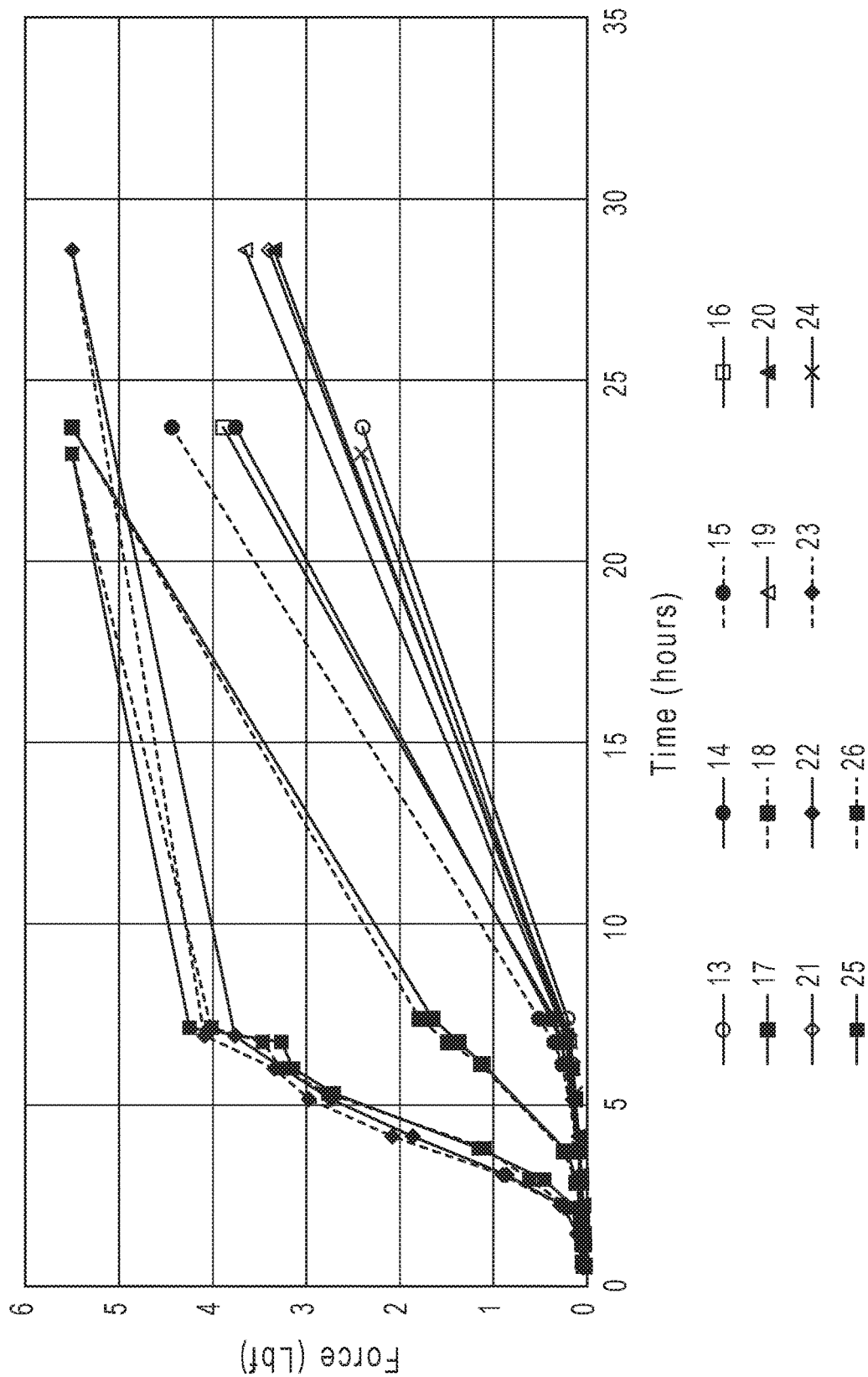
FIG. 5 shows the force value during cure of polysulfide sealants containing dried filler, dried filler and water, or wetted filler.
Figure 6:
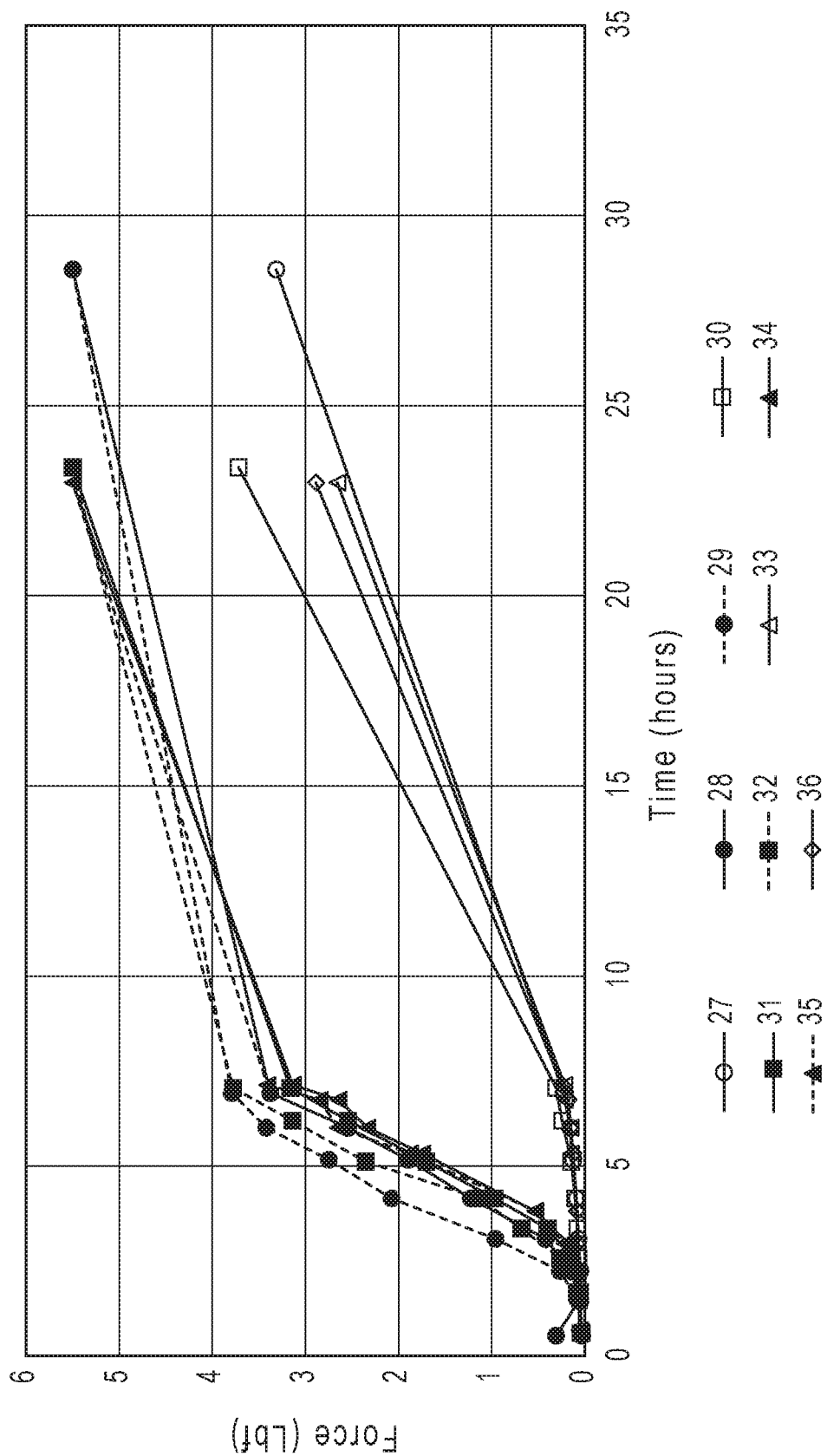
FIG. 6 shows the force value during cure of polysulfide sealants containing dried filler, dried filler and water, or wetted filler.

The cure profiles in terms of indentation force with time for the sealants listed in FIGS. 1-3 are shown in FIGS. 4-6.

The constituents of the Base component used for each of the sealants tested are shown in FIGS. 1-3. To 99.51 g of the Base component shown in Table 1 was added (1) a dry filler, (2) a dry filler and water, or (3) a wetted filler. The wt % water in the sealant composition after combining the Base and Accelerator components is also indicated in the FIGS. 1-3, where the wt % water is based on the total weight of the composition. Note that some "dry" filler contained a small amount of water.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A composition, comprising:
   a polythiol; and
   a wetted filler, wherein the wetted filler comprises greater than 0.1 wt % water, wherein wt % is based on the total weight of the wetted filler, and
   wherein the composition comprises from 0.1 wt % to 10 wt % water, wherein the water is derived from the wetted filler, and wt % is based on the total weight of the composition.

2. The composition of claim 1, wherein the wetted filler comprises from greater than 0.1 wt % to 70 wt % water, wherein wt % is based on the total weight of the wetted filler.

3. The composition of claim 1, wherein the composition comprises from 0.5 wt % to 55 wt % of the wetted filler, wherein wt % is based on the total weight of the composition.

4. The composition of claim 1, wherein,
   the composition comprises from 0.1 wt % to 3 wt % water;
   the water is derived from the wetted filler; and
   wt % is based on the total weight of the composition.

5. The composition of claim 1, wherein the composition comprises:
   from 1 wt % to 5 wt % of the wetted filler; and
   from 0.5 wt % to 3 wt % water,
   wherein wt % is based on the total weight of the composition.

6. The composition of claim 1, wherein the wetted filler comprises water and an inorganic filler.

7. The composition of claim 6, wherein the inorganic filler is characterized by:
   a BET surface area greater than 1 $m^2/g$;
   a total pore volume from 0.01 mL/g to 2 mL/g;
   an average pore diameter from 10 nm to 30 nm; or
   a combination of any of the foregoing.

8. The composition of claim 6, wherein the inorganic filler is characterized by a BET surface area greater than 20 $m^2/g$.

9. The composition of claim 1, wherein the wetted filler comprises wetted silica, wetted calcium carbonate, wetted carbon black, wetted magnesium silicate, wetted aluminum silicate, wetted magnesium hydroxide, or a combination of any of the foregoing.

10. The composition of claim 1, wherein the wetted filler comprises wetted silica, wetted calcium carbonate, wetted carbon black, or a combination of any of the foregoing.

11. The composition of claim 1, wherein the polythiol comprises a polythiol monomer, a thiol-functional prepolymer, or a combination thereof.

12. The composition of claim 1, wherein the polythiol comprises a thiol-functional sulfur-containing prepolymer.

13. The composition of claim 12, wherein the thiol-functional sulfur-containing prepolymer comprises a thiol-functional polysulfide prepolymer.

14. The composition of claim 12, wherein the composition comprises from 35 wt % to 55 wt % of the thiol-functional sulfur-containing prepolymer, where wt % is based on the total weight of the composition.

15. The composition of claim 12, wherein,
   the thiol-functional sulfur-containing prepolymer comprises a thiol-functional polysulfide prepolymer; and
   the composition further comprises a thiol/thiol cure activator.

16. The composition of claim 15, wherein the thiol/thiol cure activator comprises a metal oxide.

17. The composition of claim 1, wherein the composition further comprises a dry filler, wherein the dry filler comprises less than 0.05 wt % water, wherein wt % is based on the total weight of the dry filler.

18. The composition of claim 17, wherein the composition comprises 5 wt % to 55 wt % of the dry filler, where wt % is based on the total weight of the composition.

19. The composition of claim 18, wherein the dry filler comprises a dry inorganic filler.

20. A sealant system comprising:
   (a) a first part, wherein the first part comprises the composition of claim 1; and
   (b) a second part, wherein the second part comprises a thiol/thiol cure activator.

21. A cured sealant prepared from the sealant system of claim 20.

22. A part comprising the cured sealant of claim 21.

23. A method of sealing a part, comprising:
   combining the first part and the second part of the sealant system of claim 20, to provide a curable composition;
   applying the curable composition to a surface of a part; and
   curing the applied composition to seal the part.

24. A part sealed using the method of claim 23.

25. A vehicle comprising the part of claim 23.

26. A vehicle of claim 25, wherein the vehicle is an aerospace vehicle.

* * * * *